United States Patent
Ramsey et al.

(10) Patent No.: US 7,658,412 B2
(45) Date of Patent: Feb. 9, 2010

(54) FRAME FOR HEAVY-DUTY VEHICLES

(75) Inventors: John Edward Ramsey, Canton, OH (US); Brian Richard Morris, Uniontown, OH (US); Michael D. Oyster, Stow, OH (US); Greg Copeland, Massillon, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 420 days.

(21) Appl. No.: 11/561,006

(22) Filed: Nov. 17, 2006

(65) Prior Publication Data

US 2007/0126263 A1 Jun. 7, 2007

Related U.S. Application Data

(60) Provisional application No. 60/738,153, filed on Nov. 18, 2005.

(51) Int. Cl.
*B62D 21/00* (2006.01)
(52) U.S. Cl. .................... 280/784; 296/203.01
(58) Field of Classification Search ............. 280/784; 296/203.1
See application file for complete search history.

(56) References Cited

U.S. PATENT DOCUMENTS

| | | | |
|---|---|---|---|
| 4,412,690 A | 11/1983 | Prokop et al. | |
| 4,929,008 A | 5/1990 | Esfandiary | |
| 5,088,763 A | 2/1992 | Galazin et al. | |
| 5,203,585 A | 4/1993 | Pierce | |
| 5,335,932 A | 8/1994 | Pierce | |
| 5,720,489 A | 2/1998 | Pierce et al. | |
| 6,073,947 A | 6/2000 | Gottschalk et al. | |
| 6,425,593 B2 | 7/2002 | Fabris et al. | |
| 6,834,912 B2 | 12/2004 | Cardimen et al. | |
| 7,198,298 B2 | 4/2007 | Ramsey | |
| 2006/0170205 A1 | 8/2006 | Ramsey et al. | |
| 2007/0216147 A1 | 9/2007 | Ramsey | |

FOREIGN PATENT DOCUMENTS

| | | |
|---|---|---|
| DE | 20300428 U1 | 3/2003 |
| EP | 1057716 A1 | 12/2000 |
| EP | 1284208 A2 | 2/2003 |

OTHER PUBLICATIONS

European Patent Office, Extended European Search Report, dated Nov. 3, 2009.

*Primary Examiner*—Lesley Morris
*Assistant Examiner*—Marc A Scharich
(74) *Attorney, Agent, or Firm*—Krugliak, Wilkins, Griffiths & Dougherty Co., L.P.A.; David P. Dureska; Edward T. Kennedy

(57) ABSTRACT

A frame for a heavy-duty vehicle includes a pail of spaced-apart, parallel, elongated, and longitudinally-extending main members. At least a pair of transverse cross members extend between and are attached to the main members, and each one of at least a pair of hangers is attached to and depends from a respective one of the main members and/or the cross members. A component is disposed between each one of the hangers and its respective main member, or alternatively is incorporated into the hangers, for absorbing the energy that is created by an extreme event during vehicle operation, to reduce the possibility of damage to the main members and/or the cross members caused by movement of at least one of the hangers during the extreme event.

17 Claims, 16 Drawing Sheets

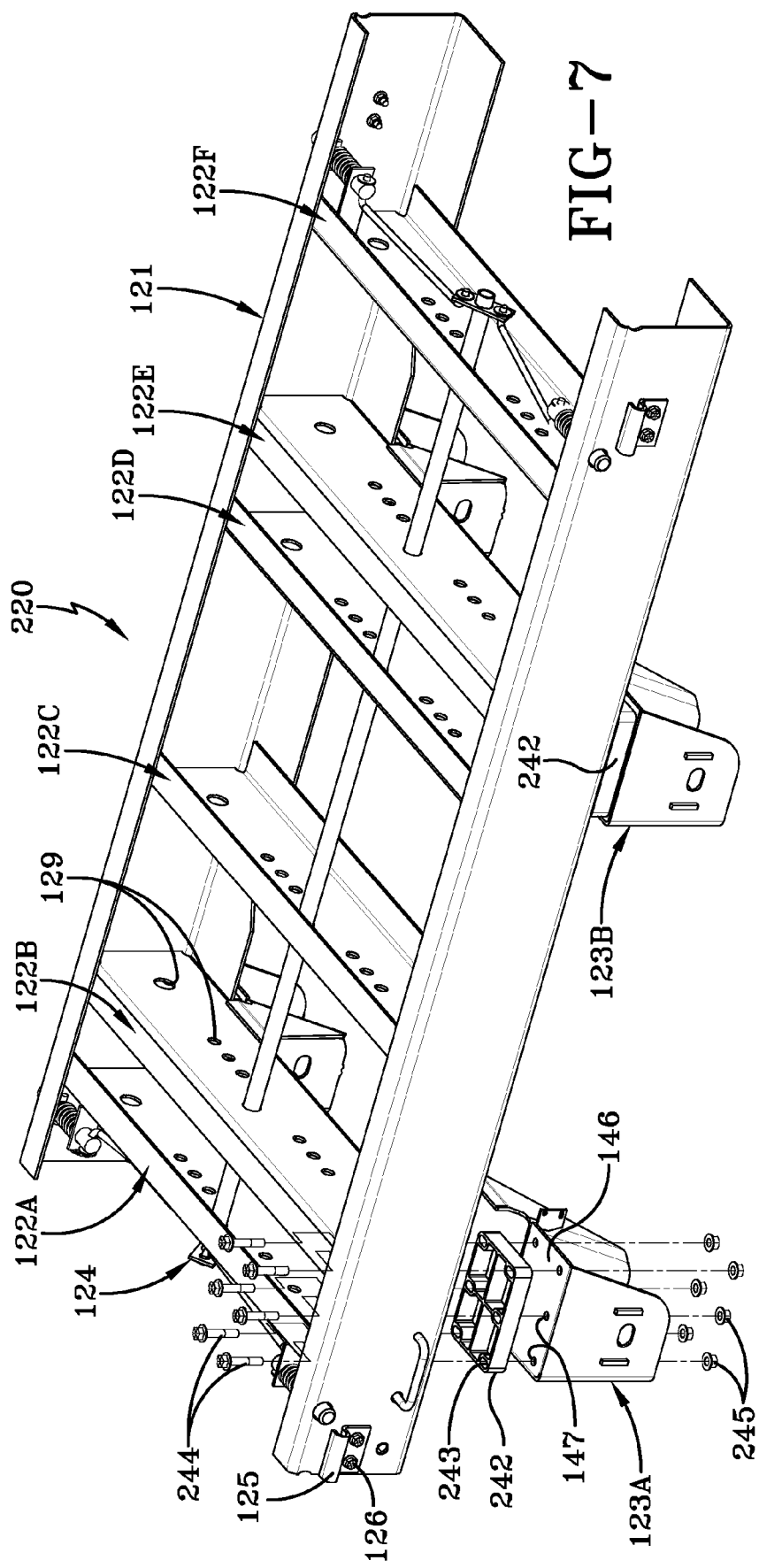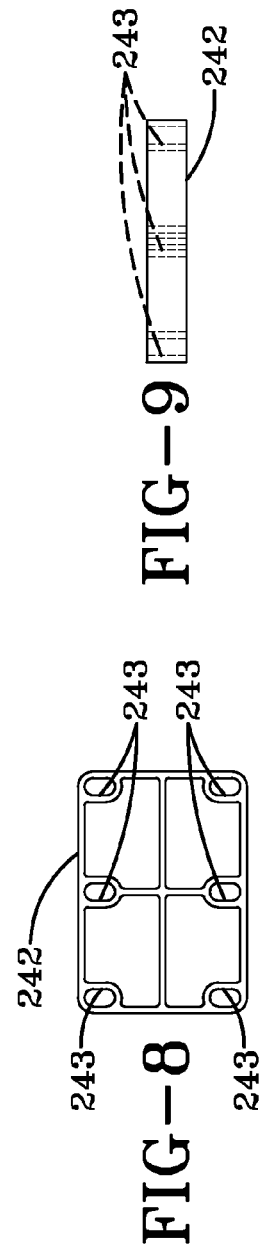

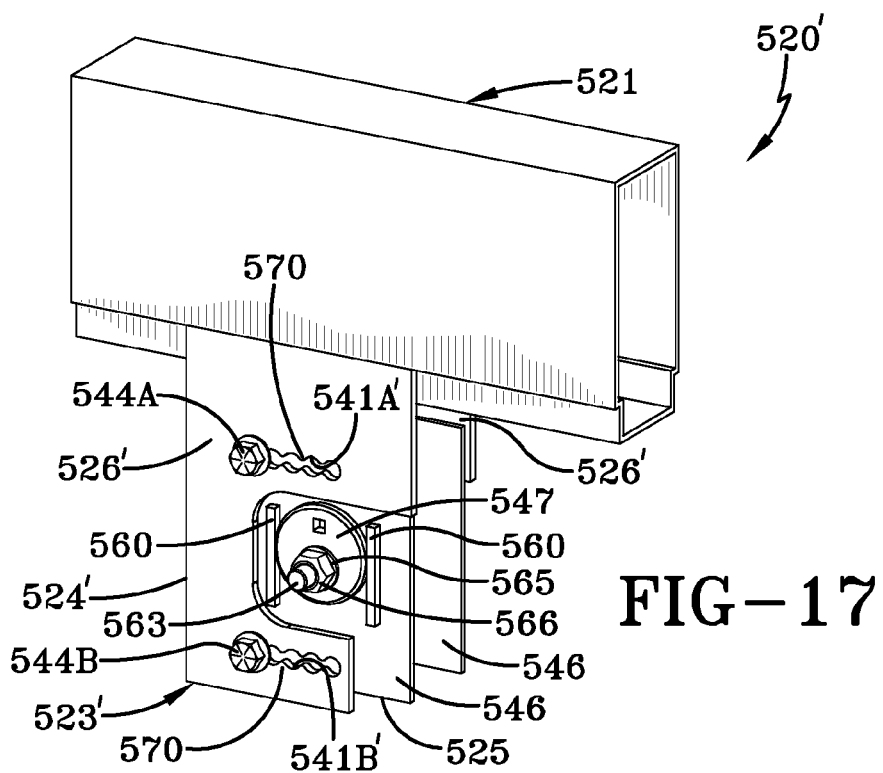
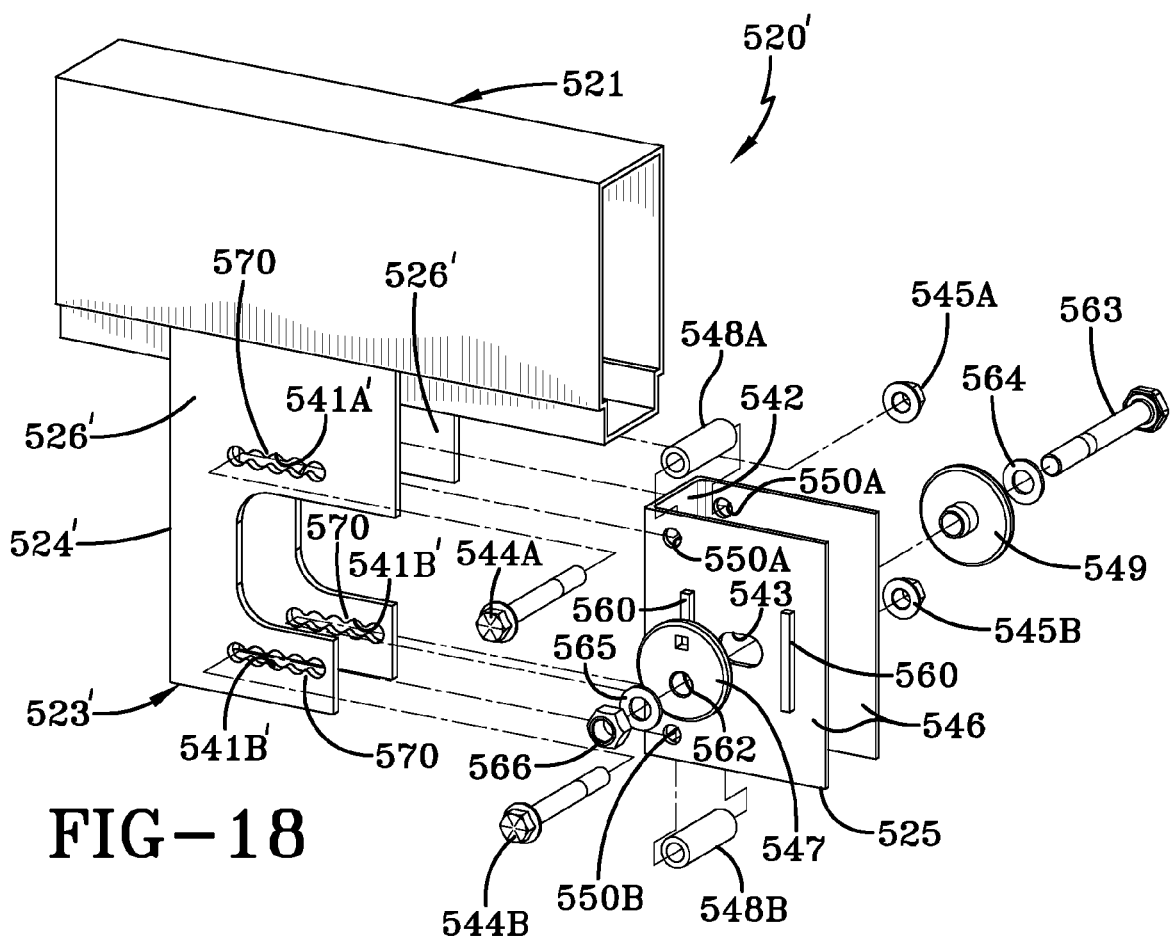

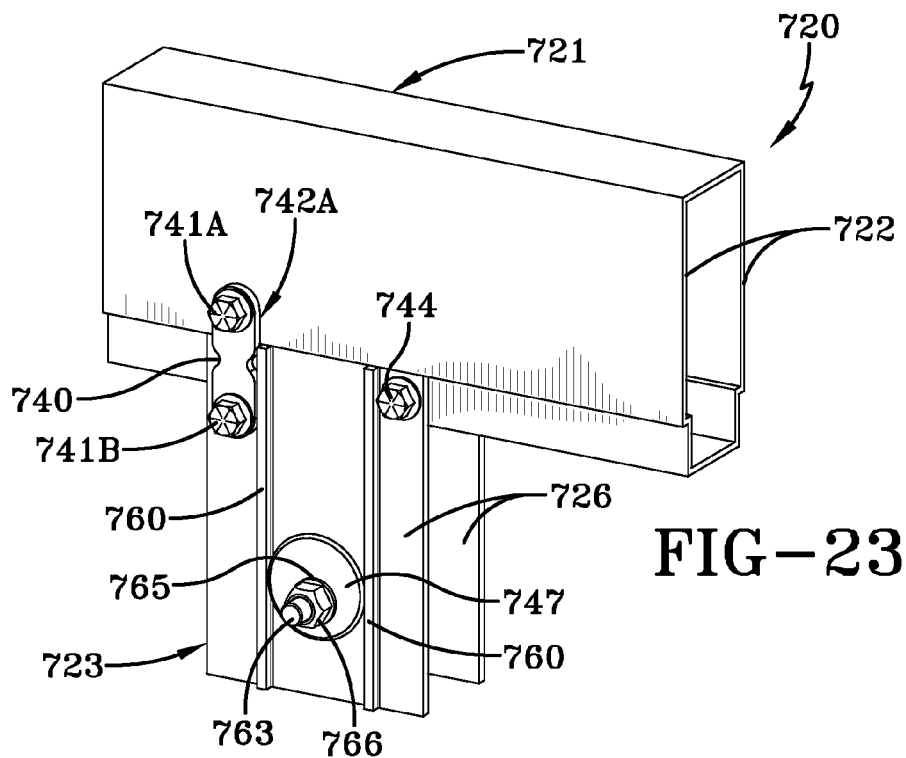
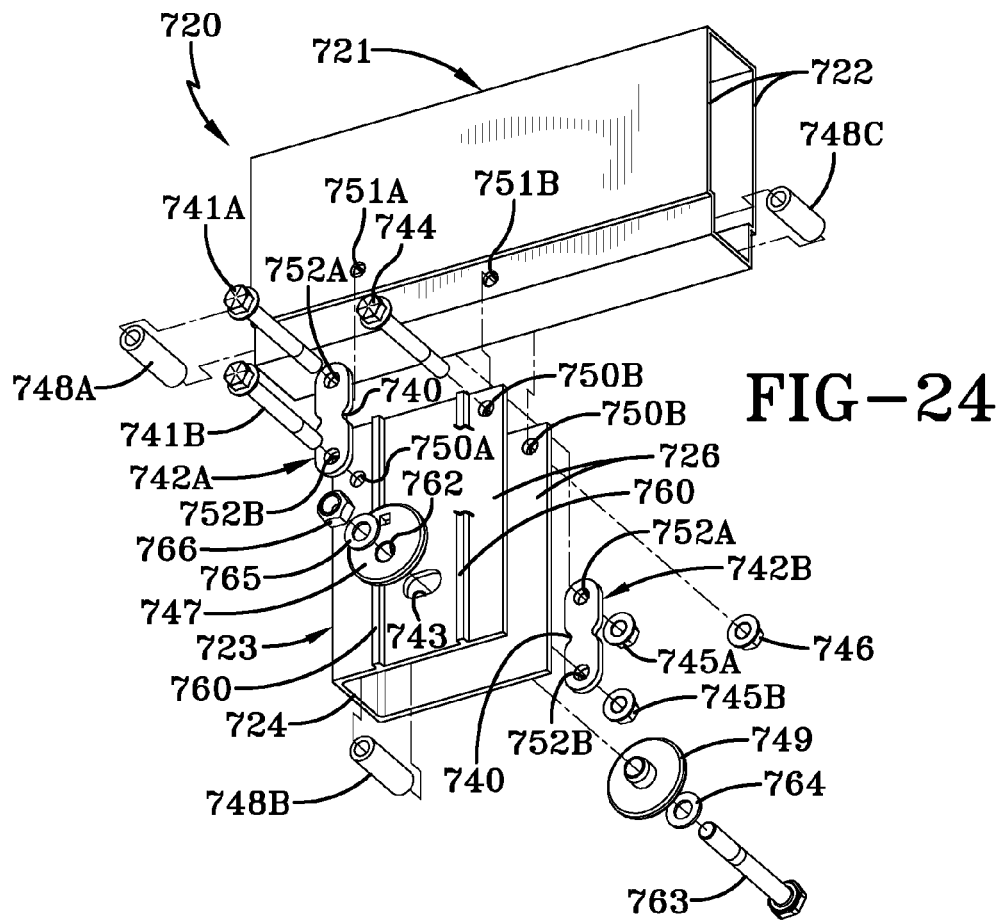

FRAME FOR HEAVY-DUTY VEHICLES

CROSS-REFERENCE TO RELATED APPLICATION

This application claims the benefit of U.S. Provisional Patent Application Ser. No. 60/738,153, which was filed on Nov. 18, 2005.

BACKGROUND OF THE INVENTION

1. Technical Field

The invention relates to heavy-duty vehicles, and in particular to frames and subframes for heavy-duty vehicles having improved energy absorption characteristics. More particularly, the present invention is directed to frames and subframes for heavy-duty vehicles which include a component that is disposed between the suspension hangers and the main members of the frame or subframe from which the hangers depend, or is incorporated into the hangers, and which absorbs energy that is created by a single-wheel impact or by a wheel becoming restrained in service, thereby reducing the possibility of damage to the hangers or the members of the frame or subframe caused by such an event.

2. Background Art

Heavy-duty vehicles that transport cargo, for example, tractor-tailers or semi-trailers, and straight trucks such as dump trucks, typically include leading or trailing arm suspension assemblies that connect the axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle primary frames, movable subframes and non-movable subframes.

In the heavy-duty vehicle art, one or more axle/suspension systems usually are suspended from a single slider box. It is understood that a slider box outfitted with usually two axle/suspension systems typically is referred to as a slider or slider tandem, and for purposes of convenience and clarity, will hereinafter be referred to as a slider tandem. Of course, a slider box may also be outfitted with a single axle/suspension system, or three or more axle/suspension systems. By way of example, reference herein shall be made to a slider tandem having a pair of axle/suspension systems mounted thereon, with the understanding that such reference also applies to a slider outfitted with one, three or more axle/suspension systems The slider tandem in turn is mounted on the underside of the trailer primary frame, and is movable longitudinally there along to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or distributes the trailer load so that it is within legal limits. Once properly positioned, the slider tandem is locked in place on the underside of the trailer by a retractable pin mechanism.

A slider box typically includes a pair of longitudinally extending elongated main members or rails that are parallel to one another The parallel spacing between the main members is maintained by cross members, which extend transversely between and are connected to the main members. The main members and the cross members of prior art slider boxes ate usually made of steel, which enables the cross members to be butted against and welded to the inboard surface of the main members. Other components that are part of or are related to the slider box, such as reinforcing members and suspension assembly hangers, typically are also made from steel and ate welded to the main members and/or the cross members It should be noted that, while the hangers are typically engineered as part of the axle/suspension system, they are often considered to be part of the slider box once they are connected to the main members of the slider box For the purpose of clarity, reference hereinafter shall be made to the hangers as part of the slider box. The slider box typically is movably attached to the vehicle primary frame by a retractable pin mechanism.

One consideration in the design of a slider box is durability. More particularly, heavy-duty vehicles, such as tractor-trailers, which contain more than one non-steerable axle are subject to lateral or side loads during vehicle operation. Lateral loads can act through the slider box in opposite directions, which in turn may create bending loads, the effect of which can be significant. Moreover, a slider box is often subjected to strong vertical and longitudinal loads. Thus, it is desirable to have a slider box with a durable design to control all of these loads.

Both the slider box and the axle/suspension system of a heavy-duty vehicle slider tandem must also be durable in order to withstand the force created by extreme events. Extreme events typically include single-wheel impacts caused by a wheel striking a bump in a road, a large pot-hole, a roadside guard rail, or a fueling station post, and the static hang-up of a wheel in service, which is a low-speed event wherein a tire is hung up or stopped temporarily during service until the vehicle pulls through the event. When a vehicle encounters an extreme event, vertical and horizontal crush forces are produced that potentially can cause significant damage to the slider box. More specifically, in a typical prior art slider tandem, when a vertical crush force is produced, a horizontal force in the rearward or aft direction also is produced, wherein the beam of a trailing beam axle/suspension system pulls toward the rear of the vehicle, in turn causing the rear portion of the hanger to which it is pivotally attached to impact or move vertically upward into the main member with significant force.

The vertical and horizontal crush forces may be of differing magnitudes at different points throughout the axle/suspension system, depending on the nature of the impact. For example, a static hang-up of a wheel in service is likely to produce a greater force than simply striking a bump in the road. A side force may also be produced if the impact is on a single wheel, which may cause the beam of the axle/suspension system to pull back and sideways, potentially causing the hanger to twist. These impacts could damage, or in an extreme case, cause the slider box main member and/or one or more of the attached cross members to fail, in either instance eventually requiring replacement, which is costly and time-consuming. Although the hanger typically is not damaged from such impacts, it usually also is replaced along with the main member. This design of a typical slider tandem causes many vehicles containing such slider tandems, including semi-trailers and tractor-trailers, to be out of service for extended periods of time after extreme events, such as single-wheel impacts, until the entire slider box can be replaced. This represents a significant problem in the trucking industry.

Another consideration in the design of a slider box is weight. More particularly, it is desirable to reduce the weight of a slider box as much as possible, while still maintaining performance characteristics and durability. Such a weight reduction decreases the amount of fuel that the heavy-duty vehicle consumes, leading to a reduction in fuel costs, and also enables more vehicle weight capacity to be devoted to the payload, thereby enabling a larger payload to be transported while the vehicle remains within the maximum weight limit that is set forth by load and bridge laws, thereby increasing the overall profitability of the vehicle.

To reduce the weight of the slider box, the use of structural materials that are lighter than steel, such as aluminum and aluminum alloys for the main members, cross members, and/or other components has often been explored in the prior art. However, certain characteristics of aluminum, such as high thermal conductivity and a low melting point, make the welding of aluminum components different, and potentially more difficult, than the welding of steel components In addition, aluminum components that are welded to one another or to a dissimilar metal, such as steel, may exhibit fatigue at the weld area, thereby potentially creating a weaker connection when compared to steel components that are welded together.

The potential for a weaker connection may become a concern at the interface between the main members and the hangers, and also at any interface between the cross members and the hangers. Since the axle/suspension system typically pivotally connects to the hangers, which are typically welded to the main members, the interface between the hangers and the main members is instrumental in reacting the loads or forces that act on the axle/suspension system, which may highly stress the rigid attachment of the hanger to the main member. Such stress may cause a welded connection that involves a material which is not readily welded, and therefore may be less than optimal, to undesirably fail, thereby reducing the durability of the slider box.

As a result, the limited ability of prior art heavy-duty vehicle frames and subframes to absorb the energy created by extreme events without significant damage, as well as the limited ability to provide an optimal connection between the hangers and the main members when lightweight materials are used, makes it desirable to develop heavy-duty vehicle frames and subframes that overcome these disadvantages. The present invention satisfies these needs.

SUMMARY OF THE INVENTION

An objective of the present invention is to provide a frame or subframe for a heavy-duty vehicle having a discrete component that absorbs the energy created by single-wheel impacts or static hang-ups, thereby reducing damage to the main members and/or other components of the frame or subframe caused by such an event.

Another objective of the present invention is to provide an easier, more efficient and cost-effective method of repairing a heavy-duty vehicle frame or subframe that has been subjected to a severe single wheel impact or static hang-up Yet another objective of the present invention is to provide a frame or subframe for a heavy-duty vehicle having an optimal connection between the hangers and the main members when lightweight materials awe used.

These objectives and advantages are obtained by the frame for a heavy-duty vehicle of the present invention. In an exemplary embodiment of the invention, the frame includes a pair of spaced-apart, parallel, elongated, and longitudinally-extending main members. A pair of transverse cross members extend between and are attached to the main members, and each one of at least a pair of hangers is attached to and depends from a respective one of the main members for suspending an axle/suspension system from the frame. Means for absorbing energy created by an extreme event during vehicle operation minimizes damage to at least one of the main members and the cross members which is caused by movement of at least one of the hangers during the extreme event

BRIEF DESCRIPTION OF THE DRAWINGS

The preferred embodiments of the invention, illustrative of the best modes in which applicants have contemplated applying the principles, are set forth in the following description and are shown in the drawings, and are particularly and distinctly pointed out and set forth in the appended claims.

FIG. 7 is a partially-exploded, driver-side top rear perspective view of a second exemplary embodiment of the slider box of the present invention, showing a spacer component disposed between each one of the hangers and its respective slider box main member;

FIG. 8 is an enlarged top plan view of the spacer component of the second exemplary embodiment slider box of the present invention, as shown in FIG. 7;

FIG. 9 is a side elevational view of the spacer component of FIG. 8, with hidden portions represented by dashed lines;

FIG. 17 is a fragmentary driver-side top rear perspective view of a sixth exemplary embodiment of a portion of the slider box of the present invention, showing a two-piece hanger structure formed with a series of round interconnected openings and mounted on a slider box main member;

FIG. 18 is a partially-exploded driver-side top rear perspective view of the portion of the slider box of FIG. 17;

FIG. 23 is a fragmentary driver-side top rear perspective view of a ninth exemplary embodiment of a portion of the slider box of the present invention, showing a notched strip mounted at and extending between the outboard front interface of the hanger and slider box main member;

FIG. 24 is a partially-exploded driver-side bottom real perspective view of the portion of the slider box of FIG. 23;

DESCRIPTION OF THE PREFERRED EMBODIMENTS

Figure 1:
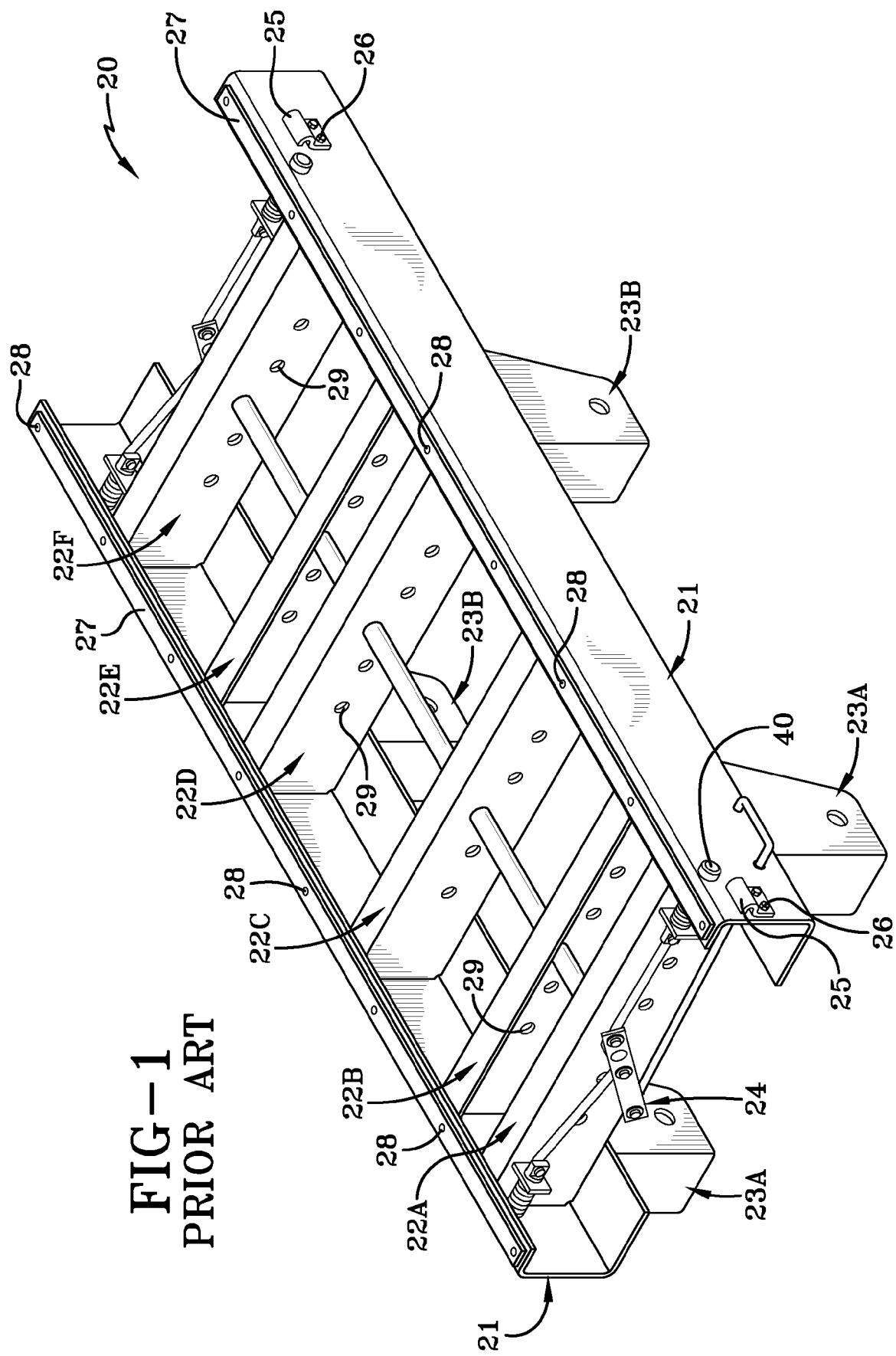
FIG. 1 is a driver-side top front perspective view of a prior art slider box for a heavy-duty vehicle having a pair of longitudinally extending parallel main members, a plurality of transversely extending parallel cross members, and depending hangers for suspending axle/suspension systems from the slider box.
Figure 2:
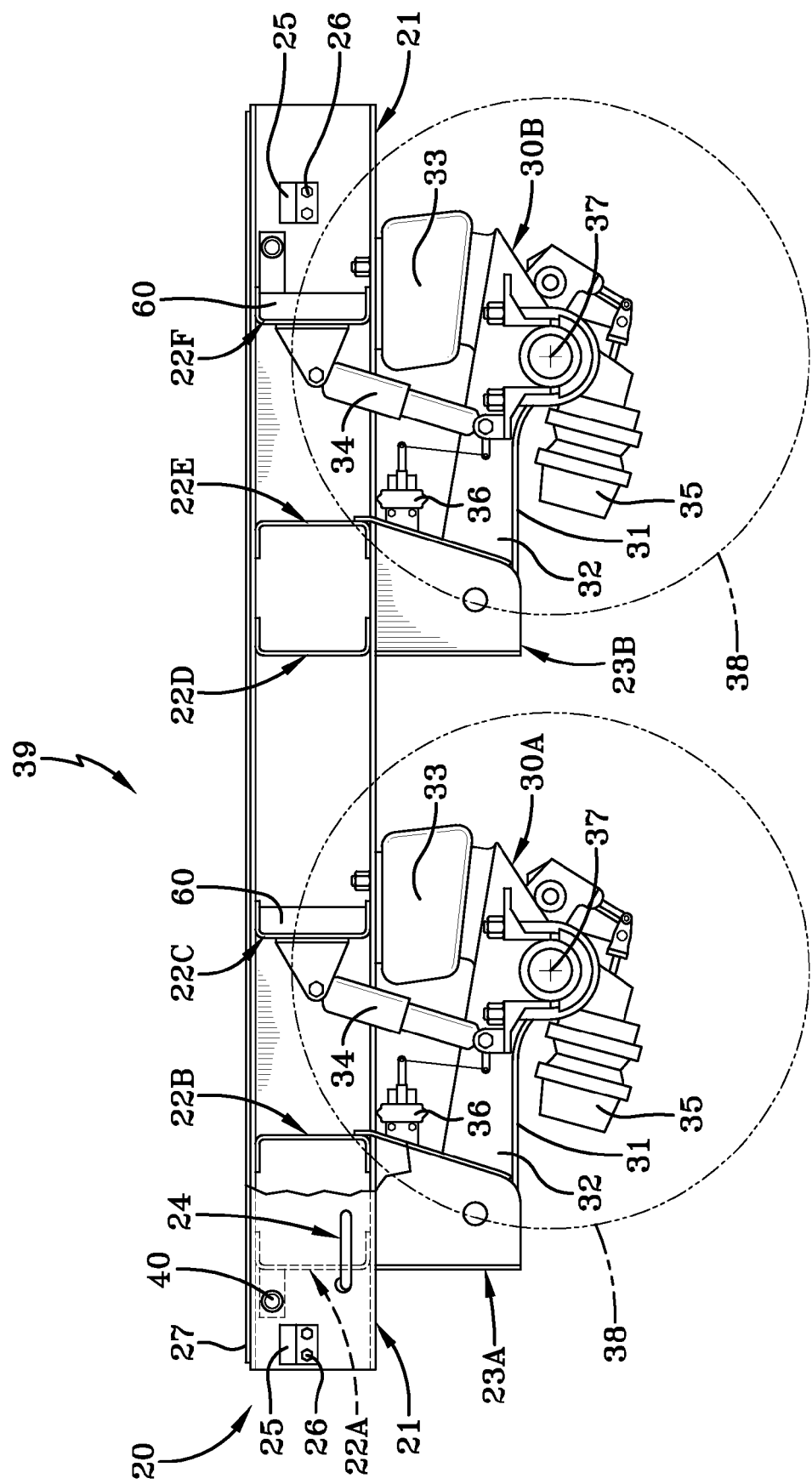
FIG. 2 is a fragmentary driver-side elevational view of a prior art heavy-duty vehicle slider tandem, incorporating the prior art slider box illustrated in FIG. 1, and showing a pair of axle/suspension systems suspended from the slider box, with portions broken away and hidden components and a vehicle tire represented by dashed lines.

As mentioned above, for the purposes of clarity and convenience, reference herein is made to a slider box, with the understanding that such reference is by way of example, and the present invention applies to heavy-duty vehicle primary frames, movable subframes and non-movable subframes. In order to better understand the slider box of the present invention, a prior art slider box will be described first. The prior art slider box for, a heavy-duty vehicle, such as a semi-trailer, is indicated generally at 20 and is shown in FIG. 1. Slider box 20 includes a pair of longitudinally extending main members 21, a plurality of cross members 22A through F, and a retractable pin mechanism 24. Front and rear pairs of hangers 23A and 23B, respectively, are attached to and depend from slider box main members 21 for suspending axle/suspension systems 30A, B (FIG. 2). While hangers 23A and 23B are typically engineered as part of axle/suspension systems 30A, B, they are often considered to be part of slider box 20 once they are connected to main members 21, and for the purpose of clarity, reference hereinafter shall be made to the hangers as part of the slider box.

More particularly, each main member 21 is an elongated, generally C-shaped beam made of a metal, such as steel or other robust material. Likewise, the other components of slider box 20, including pin mechanism 24 and attached hangers 23, are formed of a similar robust material, unless otherwise noted. The open portion of each main member 21 is opposed to the open portion of the other main member, and faces inboard relative to slider box 20. Main members 21 are connected to each other in transversely spaced-apart parallel relationship by longitudinally-spaced parallel cross members 22A-F, which extend between and are perpendicular to main members 21. Each end of each cross member 22 nests in the open portion of a respective one of main members 21, and is secured therein by any suitable means such as welding or mechanical fastening. Each cross member 22 is a generally C-shaped beam made of a metal such as steel or other suitable material, and has a plurality of openings 29 formed in its vertically extending surface. Openings 29 are aligned with corresponding openings formed in the other cross members 22 to provide for passage of air and/or fluid conduits, electrical lines, and the like used in the operation of the semi-trailer (not shown).

Each front hanger 23A is attached by welding or other suitable means, to the lowermost surface of a respective one of main members 21 at a location directly beneath cross members 22A, B. Each rear hanger 23B similarly is attached at a location directly beneath cross members 22D, E. Each main member 21 has a pair of rail guides 25 mounted on its outboard surface by bolts 26. Each rail guide 25 is mounted adjacent to a respective one of the front and rear ends of main member 21. A low friction strip 27 is attached to the uppermost surface of each main member 21 by recessed fasteners 28, and extends generally the entire length of main member 21. Strip 27 is formed of any suitable low friction material, such as ultra-high molecular weight polyethylene.

As mentioned hereinabove, and as best shown in FIG. 2, prior art slider box 20 supports front and rear axle/suspension systems 30A and 30B, respectively. Thus, a slider tandem, which includes slider box 20 and axle/suspension systems 30A, B, is indicated generally at 39 Inasmuch as each axle/suspension system 30A, B is suspended from slider box 20, but does not form an integral part thereof, only the major components of each axle/suspension system will be cited for aiding in the description of the environment in which the prior art slider box operates.

Each axle/suspension system 30A, B includes generally identical suspension assemblies 31 suspended from each one of the pair of hangers 23A, B, respectively. Each suspension assembly 31 includes a suspension beam 32 which is pivotally mounted on its respective hanger 23 in a manner known to those skilled in the art An air spring 33 is suitably mounted on and extends between the upper surface of the rearward-most end of suspension beam 32 and main member 21 at a location directly beneath a certain one of cross members 22C, F. A shock absorber 34 extends between and is mounted on suspension beam 32 and a selected one of cross members 22. One or more reinforcement struts 60 is strategically attached within each cross member 22C, F to strengthen the cross member for supporting suspension assemblies 31. Other components of suspension assembly 31, mentioned herein only for the sake of relative completeness, include an air brake 35 and a height control valve 36. An axle 37 extends between and is captured in the pair of suspension beams 32 of each axle/suspension system 30A, B. Wheels/tires 38 are mounted on each end of axle 37.

Slider tandem 39 is movably mounted on a trailer body (not shown) by slidable engagement of rail guides 25 with spaced apart, parallel, elongated longitudinally-extending, and generally Z-shaped tails (not shown) which are mounted on and depend from the underside of the primary frame members (not shown) of the trailer body. Each low friction strip 27 abuts the bottom surface of the uppermost portion of a respective one of the Z-shaped rails to provide a smooth, generally friction-free contact surface for slidable movement of slider tandem 39 beneath the trailer body. Slider tandem 39 is selectively positioned relative to the trailer body for optimum load distribution and trailer versatility by retractable pin mechanism 24. More particularly, pin mechanism 24 includes pins 40, and each pin engages a respective selected one of a plurality of openings (not shown) formed in the rails, in a manner well-known to those having ordinary skill in the heavy-duty vehicle art.

As described above, it is desirable to construct slider boxes, such as prior art slider box 20, in a manner that enables them to withstand the various load conditions that they will be subjected to during movement of the semi-trailer over the load. For example, vehicles containing more than one non-steerable axle 37 can be subjected to lateral or side loads, which are directed through hangers 23A, B since they are attached to slider box 20. Also, longitudinal loads can adversely affect a slider box. More particularly, in certain sharp turns, known as drag turns, the front axle is dragged sideways in one direction, while the tear axle is dragged sideways in the opposite direction, which creates a twisting, torsional action or racking effect on slider box 20. Such a racking effect, as well as the effect of all of the lateral and/or longitudinal loads on slider box 20, can be significant.

In addition to lateral, longitudinal and racking loads, slider boxes 20 must be capable of withstanding extreme vertical loads which are inputted through suspension assemblies 30A, B and hangers 23A, B. In prior art slider tandem 39, cross members 22C and 22F are located directly above the respective areas of attachment of air springs 33 on main members 21 to provide support, and cross members 22A, B, D and E provide support to hangers 23A, B. Prior art slider box 20 and similar designs attempt to control the adverse effect produced by vertical loads by using rigid, and therefore heavy, main members 21 and cross members 22. Although this heavy and rigid configuration aids in the capability of prior art slider box 20 to withstand such loads, the ability of such prior art slider box designs to optimally withstand severe loads, such as those which may be produced when the semi-trailer encounters an extreme event such as a single-wheel impact or a static hang-up, is less than optimum.

More specifically, when the semi-trailer encounters such an extreme event, which in turn generates extreme forces, significant stress is caused at the joints of cross members 22 and main members 21 of slider box 20 The forces that are generated when the trailer encounters a single-wheel impact by striking a bump, a large pothole, a guard rail or a post, or encounters a static hang-up in which a wheel is restrained in service, can cause axle/suspension system 30 to move in an undesirable manner and thus potentially damage slider box main members 21 and/or other slider box components.

For example, when a single-wheel impact occurs, a force is generated which drives suspension beam 32 rearwardly and inboardly, causing it to pull hanger 23 This pull causes hanger 23 to twist and push into main member 21 with significant force, which can in turn cause damage to or failure of the main member. In even mote extreme circumstances, such as in a static hang-up in which wheels/tires 38 are caught up on a guard rail, hanger 23 could also fail due to the extreme stress. When such circumstances occurred in prior art slider box 20, the failed components, namely main member 21, cross members 22A, B, and/or hanger 23A, would have to be replaced at significant cost, including materials, time and labor. In addition, the trailer typically would be out of service for a substantial period of time to allow these essential components to be replaced. In many cases, the damage could be so significant that the entire slider box 20 must be replaced.

This potential for damage may be increased when lightweight materials are used to reduce the weight of prior art slider box 20. More particularly, main members 21, cross members 22, hangers 23 and other components of prior art slider box 20 traditionally were made from steel and welded together, as described above. In order to save weight, the use of structural materials that are lighter than steel, such as aluminum and aluminum alloys, for main members 21, cross members 22 and other components of slider box 20 has been explored However, the difficulty associated with welding aluminum components to one another or to a dissimilar material creates the potential for a weaker connection at the interface between the main members and the hangers. Therefore, the forces created by an extreme event, as described above, may cause such a potentially weaker connection to undesirably fail, which may again result in damage to main member 21, cross members 22, and/or other components of prior art slider box 20.

Figure 3:
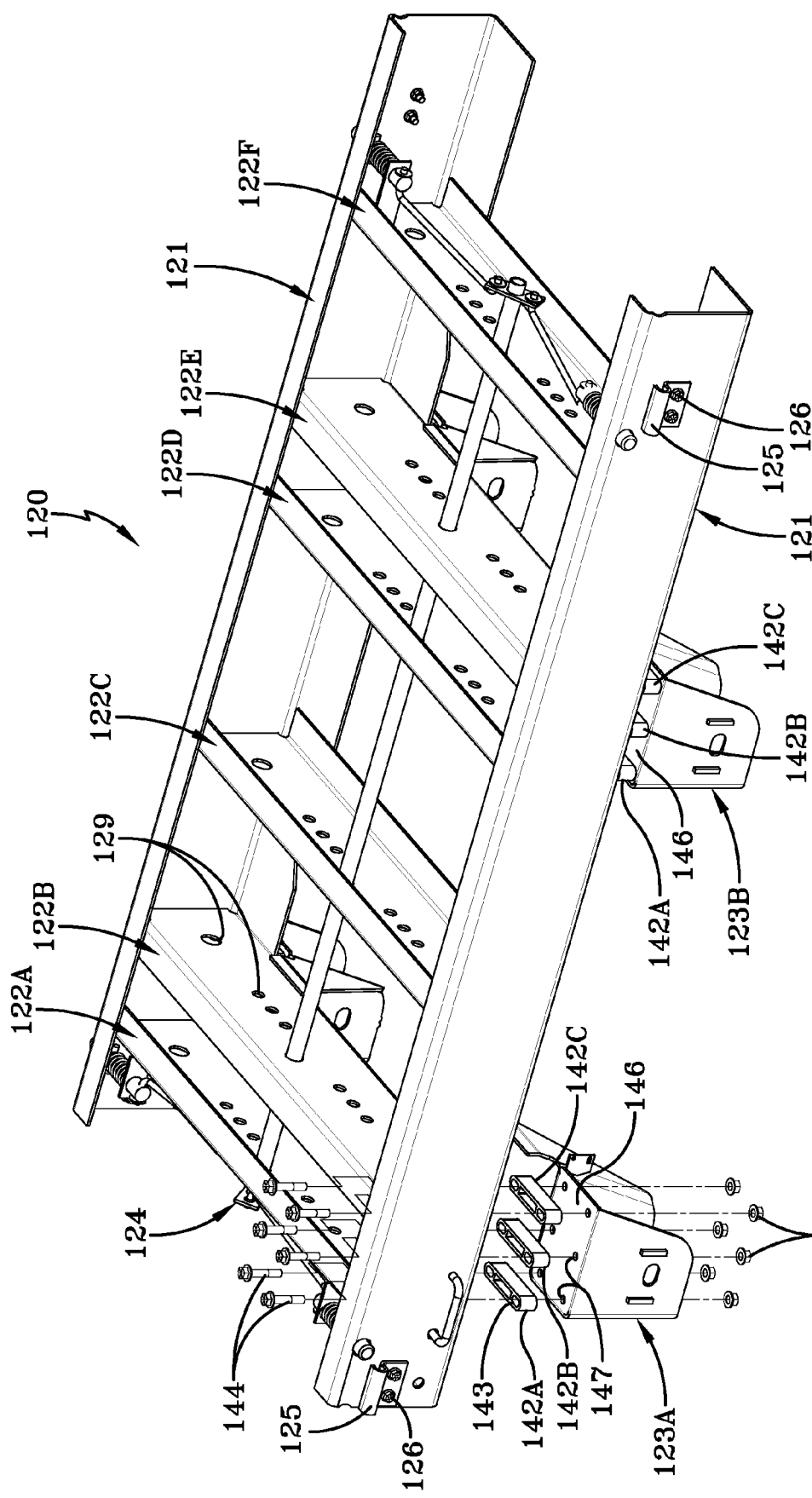
FIG. 3 is a partially-exploded, drivel-side top rear perspective view of a first exemplary embodiment of the slider box of the present invention, showing a plurality of spacer components disposed between each one of the hangers and its respective slider box main member.
Figure 4:
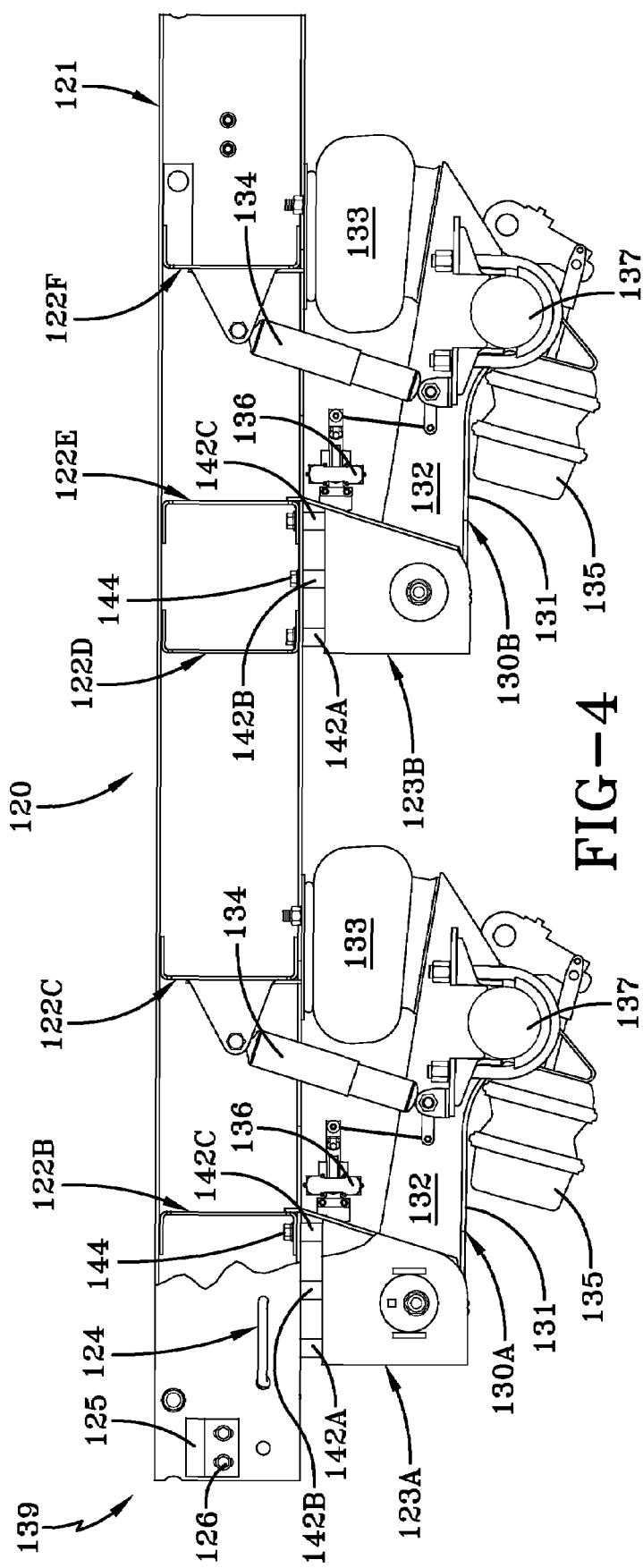
FIG. 4 is a fragmentary driver-side elevational view of a heavy-duty vehicle slider tandem, incorporating the slider box of FIG. 3, with portions broken away and showing a pair of axle/suspension systems suspended from the slider box.

The reduced ability of prior art slider box 20 to absorb the energy created by extreme events without significant damage to main members 21, cross members 22 and/or other components, and to provide an optimal connection between the main members and hangers 23 when lightweight materials are used, makes it desirable develop a slider box that overcomes these disadvantages The present invention satisfies these needs by incorporating an energy-absorbent component. The component is mounted between each hanger and its respective main member, or is formed in selected ones of the hangers, and absorbs the force of an impact. This absorbent component deflects under heavy horizontal loads and/or vertical loads to protect the structural components of the slider box, such as the main members and cross members, from the stress that is caused by the force The component preferably is made of a metallic, polymeric, or composite material, and can be easily replaced in a much more efficient and inexpensive manner than replacing main members and/or cross members. In most cases, little to no damage occurs to the main member and cross members, since the component absorbs the energy from the impact to maintain the integrity of the main member and cross members A first exemplary embodiment of the slider box for heavy-duty vehicles of the present invention is shown in FIGS. 3 and 4, is indicated generally at 120 and is an improvement over prior art slider box 20. Since first embodiment slider box 120 of the present invention differs from prior art slider box 20 mainly in that the first embodiment slider box uses present invention spacer components 142 that are disposed between main members 121 and hangers 123 by bolts 144, only the structural and resulting performance differences between the first embodiment slider box of the present invention and the prior art slider box will be described in detail below.

With particular attention to FIG. 3, just as in prior art slider box 20, slider box 120 of the present invention includes a pair of longitudinally extending main members 121, a plurality of cross members 122A through F, and a retractable pin mechanism 124. Front and rear pairs of hangers 123A and 123B, respectively, are attached to and depend from slider box main members 121, and energy-absorbing spacer components or spacers 142A-C are disposed between the hangers and main members for suspending axle/suspension systems from slider box 120, as will be described in greater detail below. Each main member 121 is an elongated, generally C-shaped beam made of metal such as steel, aluminum ox other suitable robust material, and the other components of slider box 120, including pin mechanism 124 and attached hangers 123, are formed of a similar robust material, unless otherwise noted.

The open portion of each main member 121 is opposed to the open portion of the other main member, and faces inboard relative to slider box 120. Main members 121 are connected to each other in transversely spaced-apart parallel relationship by longitudinally-spaced parallel cross members 122A-F, which extend between and are perpendicular to main members 121. Each end of each cross member 122 nests in the open portion of a respective one of main members 121, and is secured therein by any suitable means such as welding or mechanical fastening. Each cross member 122 is a generally C-shaped beam made of a metal such as steel, aluminum or other suitable material, and has a plurality of openings 129 formed in its vertically extending surface. Openings 129 are aligned with corresponding openings formed in the other cross members 122 to provide for passage of air and/or fluid conduits, electrical lines, and the like used in operation of the semi-trailer (not shown)

Each main member 121 has a pair of tail guides 125 mounted on its outboard surface by bolts 126. Each rail guide 125 is mounted adjacent to a respective one of the front and rear ends of main member 121. A low friction strip (not shown) is attached to the uppermost surface of each main member 121 by recessed fasteners (not shown) in a well-known fashion, and extends generally the entire length of main member 121. The strip is formed of any suitable low friction material, such as ultra-high molecular weight polyethylene Turning now to FIG. 4, also as in prior art slider box 20, present invention slider box 120 supports front and rear axle/suspension systems 130A and 130B, respectively. Thus, a slider tandem, which includes slider box 120 and axle/suspension systems 130A, B, is indicated generally at 139. Since each axle/suspension 130A, B is suspended from slider box 120 of the present invention, but does not form an integral part thereof, only the major components of each axle/suspension system will be cited for aiding in the description of the environment in which the slider box of the present invention operates Each axle/suspension system 130A, B includes generally identical suspension assemblies 131 suspended from each one of the pair of hangers 123A, B, respectively. Each suspension assembly 131 includes a suspension beam 132 which is pivotally mounted on its respective hanger 123 in a manner known to those skilled in the art. An air spring 133 is suitably mounted on and extends between the upper surface of the rearwardmost end of the suspension beam 132 and main member 121 at a location directly beneath a certain one of cross members 122C, F. A shock absorber 134 extends between and is mounted on suspension beam 132 and a selected one of cross members 122. Other components of suspension assembly 131, mentioned herein only for the sake of relative completeness, include an air brake 135 and a height control valve 136. An axle 137 extends between and is captured in the pair of suspension beams 132 of each axle suspension system 130A, B. Wheels/tiles (not shown) are mounted on each end of axle 137.

As is known in the art, slider tandem 139 is mounted on a trailer body (not shown) by slidable engagement of rail guides 125 with spaced apart, parallel, elongated, longitudinally extending and generally Z-shaped rails (not shown) which are mounted on and depend from the underside of the primary frame members (not shown) of the trailer body. Slider tandem 139 is selectively positioned relative to the trailer body for optimum load distribution and trailer versatility by retractable pin mechanism 124 in a manner that is well-known to those having ordinary skill in the heavy-duty vehicle art.

With reference now to FIGS. 3 and 4, in accordance with a main feature of the present invention, energy-absorbing spacers 142A-C are disposed at the interface of and between each frame hanger 123A and B and its respective main member 121. Each spacer 142 is formed of a generally rigid material, such as a metal, polymer, or composite, which enables the spacer to act as a structurally stable column, and to be a structural component of slider box 120 that can withstand and react to the various loads to which the slider box is subjected during operation of the vehicle. However, each spacer 142 is designed with a strength limit in the vertical direction, referred to herein as the crush limit of the spacer. When the crush limit of spacer 142 is reached in an extreme event, such as during a severe single wheel impact of static hang-up, the spacer collapses, as will be described in greater detail below.

Figure 6:
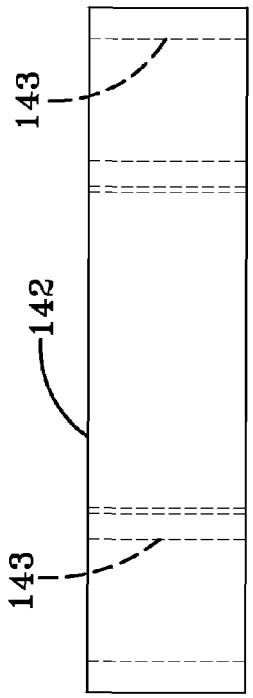
FIG. 6 is a front elevational view of the spacer component of FIG. 5, with hidden portions represented by dashed lines.
Figure 5:
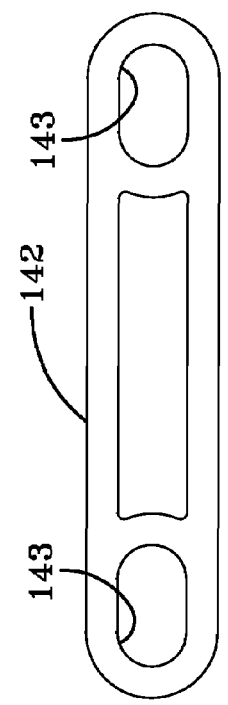
FIG. 5 is a greatly enlarged top plan view of one of the spacer components of the first exemplary embodiment slider box of the present invention, as shown in FIGS. 3 and 4.

More particularly, as shown in FIG. 3, each hanger 123A,B includes an upper horizontally-disposed plate 146 that is formed with a plurality of openings 147. With additional reference now to FIGS. 5 and 6, each spacer 142 in turn is formed with a pair of transversely-spaced openings 143. Openings 143 of each spacer 142 are aligned with a selected pair of openings 147 formed in hanger upper plate 146 and openings (not shown) formed in main member 121, so that the spacers are mounted between the upper hanger plate and a lowermost surface of a respective one of main members 121 by bolts 144 Bolts 144 pass through selected ones of aligned openings 143 and 147, after first passing through the openings formed in main member 121, preferably at a location directly beneath respective ones of cross members 122A, B, D, and E for mounting hangers 123A, B beneath the main members. Each hanger 123A, B and its respective spacers 142 are clamped to their respective main rail 121 by threadably engaging nuts 145 on threaded ends of bolts 144 and tightening the nuts on the bolts to a suitable level.

The structure and arrangement of spacers 142 allows any vertical crush forces and/or other forces encountered by slider box 120 to be progressively deflected from one spacer to the next. More particularly, the highest compressive forces tend to be at the rearward end of each hanger 123A, B. As a result, as suspension assembly 131 is pulled rearwardly in an extreme event, the suspension assembly drives the rearward end of hanger 123 up into main member 121, thereby pulling the frontward end of the hanger downwardly away from the main member. This progressive deflection of hanger 23 will cause rearwardmost spacer 142C to fail first, followed by middle spacer 142B and finally frontwardmost spacer 142A. In the case of a single-wheel impact, this progressive collapse of spacers 142C, 142B and 142A absorbs the force created by the impact and generally prevents or minimizes damage to hangers 123 and/or main members 121, and other components of slider box 120, such as cross members 122. In the case of a static hang-up, the progressive collapse of spacers 142C, 142B and 142A initially absorbs the force that is created by the hang-up, and the collapse of the spacers redistributes the force, thereby also generally preventing or minimizing damage to main members 121 and other components of slider box 120.

Moreover, in the case of a static hang-up, by yielding or collapsing in a predetermined manner, spacers 142C, 142B and 142A may help hanger 123 to deflect, which in turn may enable the wheel to move off of the obstacle that is causing the hang-up. In this manner, the progressive collapse of spacers 142C, 142B, 142A potentially reduces the load input from the static hang-up and thus may further potentially reduce damage to main members 121 and other components of slider box 120.

As mentioned above, spacers 142 preferably are formed of a metallic, polymeric, composite, or other similar material that is not subject to significant creep when it is under compression, and thereby maintains a generally consistent preload state. In this manner, spacers 142 maintain their dimensional stability to enable bolts 144 and nuts 154 to remain tight and maintain a consistent clamp load, preserving a strong connection between hanger 123 and main member 121. It is to be noted that spacers 142, while shown with solid walls, may include other wall structures as known to those skilled in the art, such as a honeycomb or ribbed structure. In addition, different configurations of spacers 142 may be used without affecting the overall concept of the invention, such as separating each above-described spacer into two or more parts, as desired according to specific design requirements.

A second exemplary embodiment of the slider box of the present invention is shown in FIG. 7, is indicated generally at 220, and is an improvement over prior art slider box 20 Inasmuch as the main difference between second embodiment slider box 220 and first embodiment slider box 120 is the construction of a second embodiment spacer component or spacer 242, as compared to first embodiment spacers 142, only the structure of the second embodiment spacer will be described.

More particularly, a single integrally formed spacer 242 is disposed between respective ones of main members 121 and hangers 123. With additional reference to FIGS. 8 and 9, spacer 242 is formed with a plurality of openings 243, each of which is aligned with a corresponding opening (not shown) formed in main member 121 and opening 147 formed in hanger upper plate 146. Each spacer 242 is mounted between upper hanger plate 146 and a lowermost surface of a respective one of main members 121 by bolts 244. Each bolt 244 passes through respective ones of aligned main member openings, spacer openings 243 and hanger plate openings 147, and a nut 245 threadably engages each bolt 244 to secure hanger 123 and spacer 242 to main member 121 at a sufficient clamp load.

Spacer 242 preferably is formed of a generally rigid material, such as a metal, polymer, or composite, which enables the spacer to act as a structurally stable column and to be a structural component of slider box 220 that can withstand and react to the various loads to which slider box 220 is subjected during operation of the vehicle. As with first embodiment spacer 142 (FIG. 3), second embodiment spacer 242 is collapsible when its crush limit is reached in an extreme event, such as during a severe single wheel impact.

More particularly, spacer 242 is mounted between upper horizontal plate 146 of its respective hanger 123 and the lowermost surface of its respective main member 121 at a location directly beneath respective cross members 122A, B or 122C, D. Spacer 242 extends generally the entire longitudinal length of each hanger upper horizontal plate 146, and absorbs vertical crush forces produced by an extreme event. As described above, in an extreme event, the deflection of hanger 123 occurs in a rearward-to-frontward manner. This progressive deflection in turn causes spacer 242 to progressively collapse in a rearward-to-frontward manner which absorbs the force created by a single-wheel impact and thereby minimizes the possibility of damage to hangers 123 and main members 121 from such forces. In the case of a static hang-up, the progressive collapse of spacer 242 initially absorbs the force that is created by the hang-up, and the collapse of the spacer redistributes the force, thereby also generally preventing or minimizing damage to main members 121 and other components of slider box 220

Moreover, in the case of a static hang-up, by yielding or collapsing in a predetermined manner, spacer 242 may help hanger 123 to deflect, which in turn may enable the wheel to move off of the obstacle that is causing the hang-up. In this manner, the progressive collapse of spacer 242 potentially reduces the load input from the static hang-up and thus may further potentially reduce damage to main members 121 and other components of slider box 120

As with first embodiment spacer 142, second embodiment spacer 242 preferably is formed of a metallic, polymeric, composite, or other similar material that is not sensitive to creep when it is under compression, and thereby maintains a consistent preload state. It is to be noted that spacers 242, while shown with solid walls, may include other wall structures as known to those skilled in the art, such as a honeycomb or ribbed structure. In addition, different configurations of spacers 242 may be used without affecting the overall concept of the invention, such as separating each above-described spacer into two or more parts, as desired according to specific design requirements.

Figure 10:
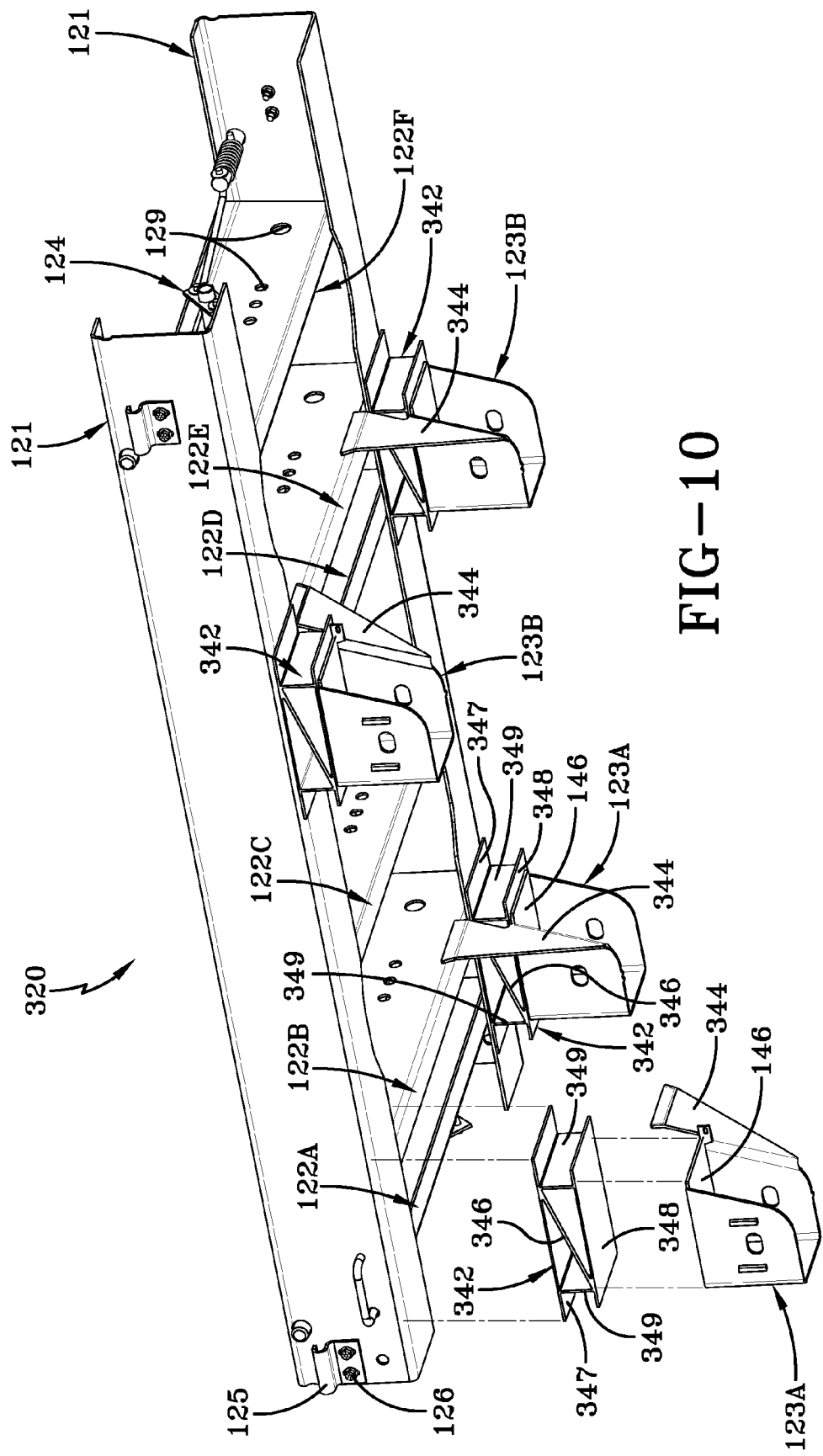
FIG. 10 is a partially-exploded, drive-side bottom rear perspective view of a third exemplary embodiment of the slider box of the present invention, showing a generally tubular spacer component disposed between respective ones of the pairs of front and rear hangers and the main members.

A third exemplary embodiment of the slider box of the present invention is shown in FIG. 10, is indicated generally at 320, and is an improvement over prior art slider box 20 Since third embodiment slider box 320 differs from first embodiment slider box 120 and second embodiment slider box 220 of the present invention mainly in that the third embodiment slider box includes a generally rectangular-shaped tubular spacer 342 instead of spacers 142 and 242, respectively, the general structure of the third embodiment slider box will not be described as it is similar to that of the first embodiment slider box and the second embodiment slider box.

Tubular spacer 342 is disposed between respective ones of main members 121 and each one of the pairs of front and rear hangers 123A and 123B. More particularly, spacer 342 includes a generally flat, horizontally-disposed upper plate 347 that is attached to a lowermost surface of main member 121 and optionally to respective ones of cross members 122A, B or 122D, E by mechanical fasteners such as bolts (not shown) of by welding or other suitable means that are known to those skilled in the art. Spacer 342 also includes a generally flat, horizontally-disposed lower plate 348 that is spaced apart from and is generally parallel to upper plate 347. Front and real spaced-apart vertical walls 349 extend between and are generally perpendicular to upper and lower plates 347, 348, and are suitably attached thereto, such as by welds. In this manner, upper and lower plates 347, 348 and vertical walls 349 form the generally tubular structure of spacer 342.

Front and rear vertical walls 349 preferably are offset rearwardly and frontward, respectively, from the front and rear edges of upper and lower plates 347, 348. A rib 346 extends diagonally within spacer 342 and extends generally the entire transverse length of the spacer for reinforcement. Rib 346 is suitably attached, such as by welding, to upper and lower plates 347, 348 and/or front and rear vertical walls 349. Lower plate 348 is attached to upper horizontal plate 146 of hanger 123 by mechanical fasteners such as bolts (not shown) or by welding or other suitable means known to those skilled in the art. Spacer 342 preferably is formed of a generally rigid material, such as a metal, polymer, composite, or other similar material, which enables the spacer to act as a column and to be a structural component of slider box 320.

When a heavy-duty vehicle employing improved slider box 320 encounters an extreme event in which significant loads are imposed on the slider box, such as a single-wheel impact, diagonal rib 346 absorbs such loads by deforming and eventually buckling when its load limit is reached. When diagonal rib 346 reaches its limit and fails, front and rear vertical walls 349 may also fail. In this manner, spacer 342 absorbs the forces and loads created by the extreme event and thus minimizes the possibility of damage from such an event to hangers 123 and main members 121. After such an event, damaged spacer 342 can be easily removed and replaced. In addition, in the case of a static hang-up, as spacer 342 deforms and absorbs forces created by the hang-up, the deformation of the spacer may redistribute the forces and may thereby also generally prevent or minimize damage to main members 121 and other components of slider box 320.

It should be noted that, in all embodiments of the present invention, certain components may be adapted to suit specific design requirements. For example, in third embodiment slider box 320, the use of spacers 342 may make it desirable to adapt hangers 123A, B for additional attachment to and reinforcement of slider box 320. Thus, a hanger extension 344, which extends inboardly from each respective hanger 123A, B and upwardly to a respective one of cross members 122C, 122E, may be used.

Figure 11:
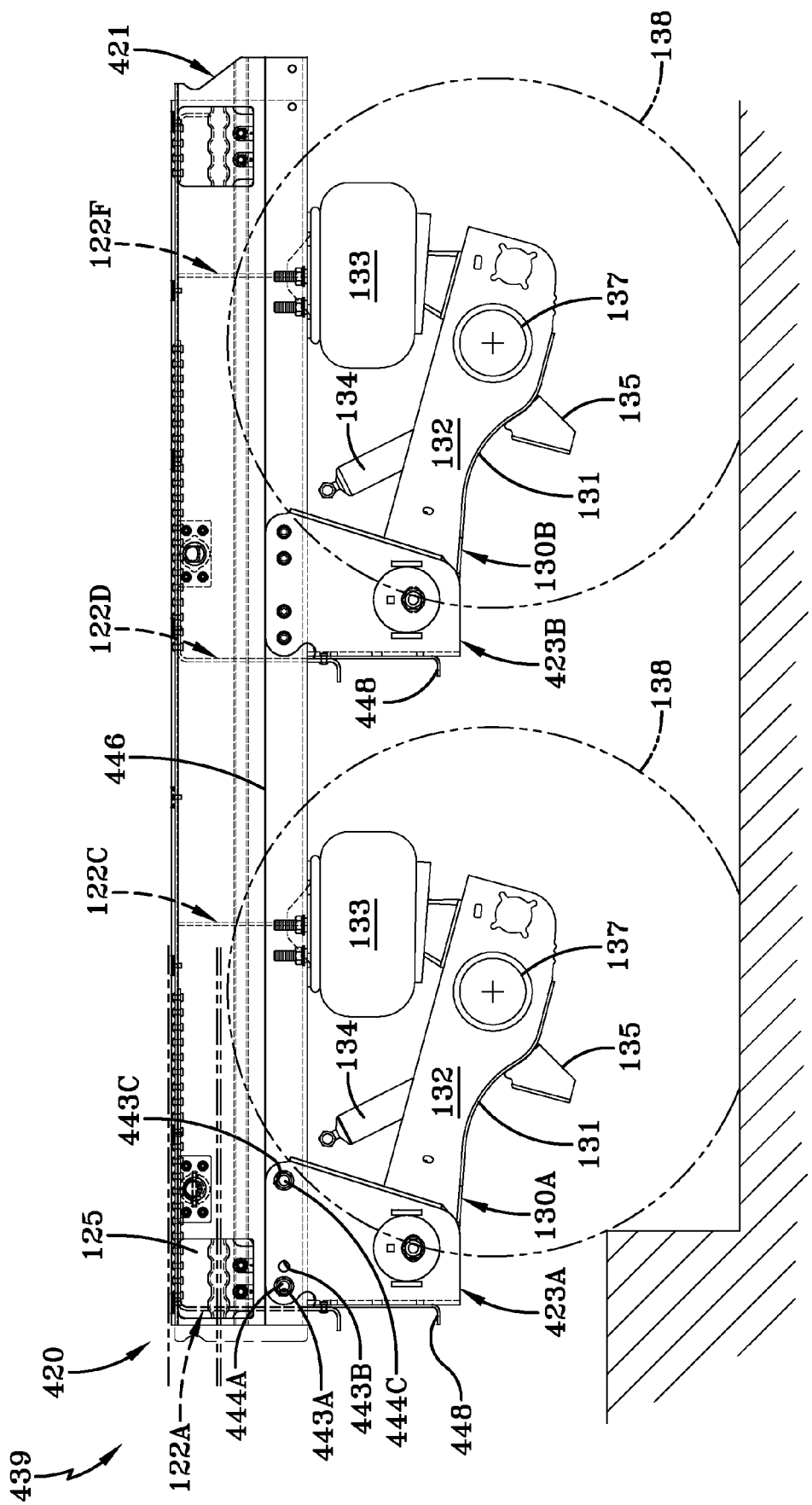
FIG. 11 is a driver-side elevational view of a heavy-duty vehicle slider tandem, incorporating a fourth exemplary embodiment of the slider box of the present invention, showing a tubular spacer component disposed within the main member and surrounding one of the bolts used to mount the hanger to the main member, and a pair of axle/suspension systems mounted on the slider box, with hidden parts represented by dashed lines.

A fourth exemplary embodiment of the slider box of the present invention is shown in FIG. 11, is indicated generally at 420, and is an improvement over prior art slider box 20. Fourth embodiment slider box 420, as with all embodiments of the present invention, supports front and rear axle/suspension systems 130A and 130B, respectively, and thus a slider tandem is indicated generally at 439. Since many aspects of fourth embodiment slider box 420 are similar to that as described above for prior embodiment slider boxes 120, 220 and 320, only the primary differences between the fourth embodiment slider box and the first, second and third embodiments of the present invention will be described below.

Figure 12:
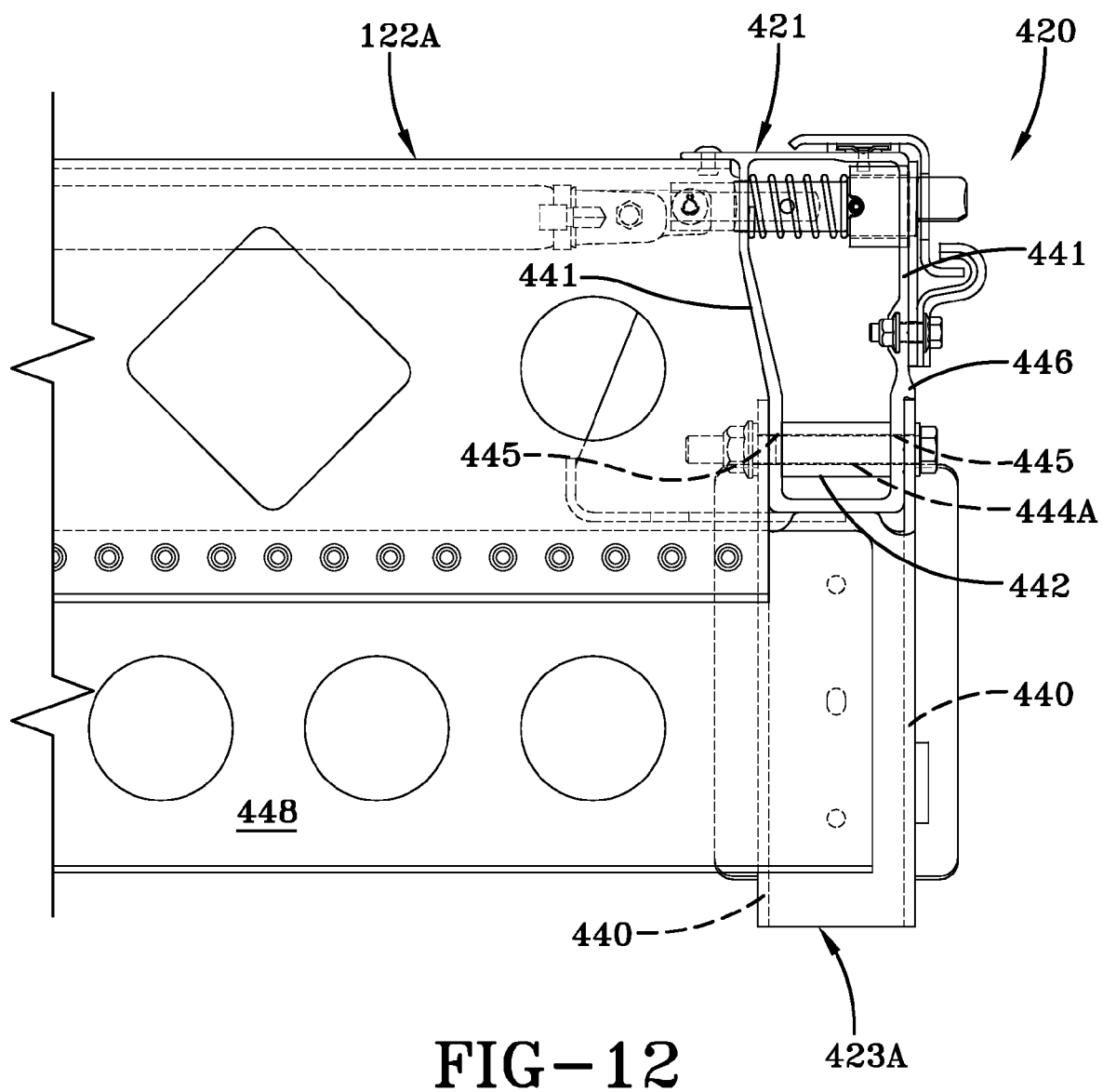
FIG. 12 is an enlarged fragmentary front elevational view of a portion of the slider box of FIG. 11, with hidden parts represented by dashed lines.

Fourth embodiment slider box 420 finds particular application when main members 421 have a generally rectangular-shaped cross section as shown in FIG. 12, rather than a C-shaped cross section, as described in the embodiments above. Accordingly, referring to FIGS. 11 and 12, in fourth embodiment slider box 420, each front hanger 423A is attached to main member 421 by large, horizontally-oriented mounting bolts 444A, C. Each mounting bolt 444A, C passes through respective pairs of front and rear aligned openings 443A, C formed in spaced-apart sidewalls 440 of hanger 423A adjacent an upper edge of each sidewall, thus creating a double-shear or double-lap joint for each of the bolts. Main member 421 includes a pair of spaced-apart sidewalls 441, in which respective pairs of front and rear aligned openings 445 (only front openings shown) ate formed. Each pair of hanger sidewall openings 443A, C is aligned with a respective one of the pair of main member sidewall openings 445, thereby enabling mounting bolts 444A, C to pass through the aligned hanger and main member openings to attach hanger 423A to main member 421

Tubular spacers 442 are disposed between main member sidewalls 441, and mounting bolts 444A, C pass through respective ones of a pair of front and rear aligned tubular spacers (only front spacer shown) Spacers 442 preferably are formed of a metallic, polymeric, composite, or other similar material, which is not subject to significant creep under compression. Such construction allows normal service load inputs into hanger 423A to be transmitted into main member 421 through a clamping friction between the hanger and main member. More particularly, spacers 442 each fill the space between main member vertical sidewalls 441 at openings 445 and thus carry the clamp load of tightened bolts 444A, C, respectively, thus protecting the sidewalls from crushing due to the clamp loads.

Figure 13:
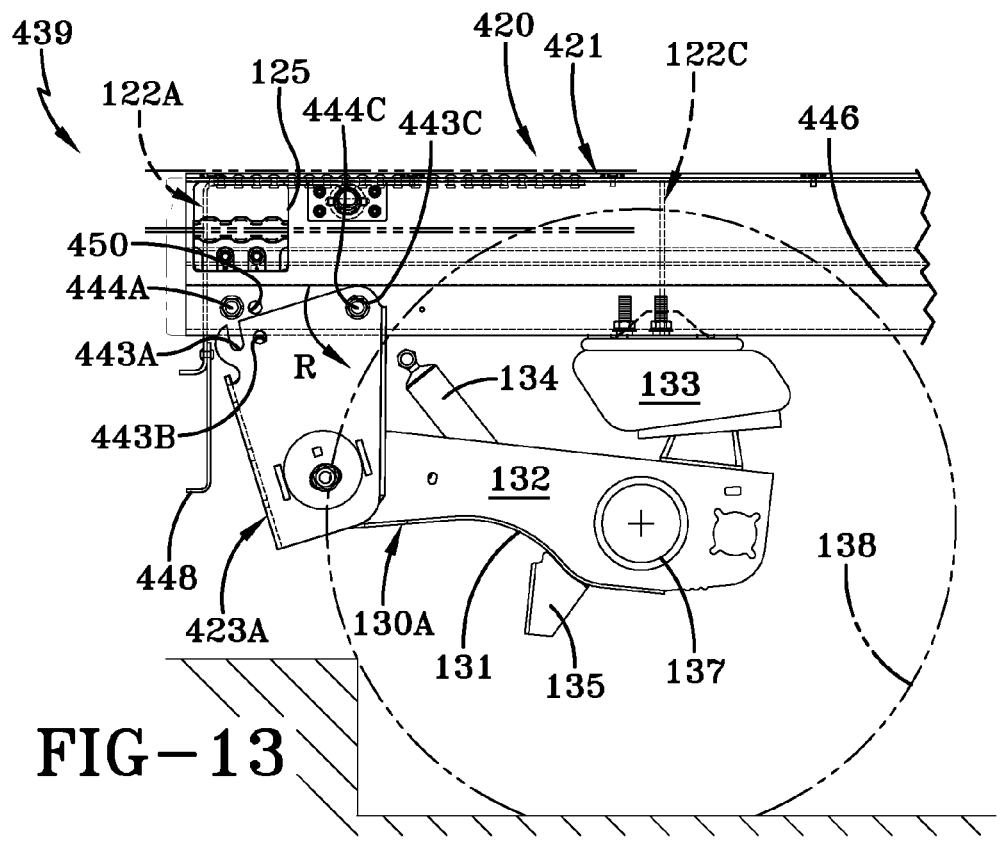
FIG. 13 is a reduced-size view similar to FIG. 11, but showing the front portion of the slider tandem and the change in position of the front hanger and axle/suspension system immediately following an extreme event.

As will be described in greater detail below, each hanger sidewall 440 is formed with an auxiliary pair of aligned openings 443B that are disposed just rearward of and adjacent to front openings 443A, and through which no fastener is passed during normal attachment of hangers 423A to main members 421, as shown in FIG. 11. Also described in greater detail below and shown in FIGS. 11 and 12, a ledge 446 preferably is extruded into the outboard one of main member sidewalls 441 just above the attachment interface of hanger 423A to main member 421, so that the upper edge of the outboard one of hanger sidewalls 440 abuts the ledge Turning now to FIG. 13, when a heavy-duty vehicle employing slider box 420 encounters an impact or other extreme event, the aforementioned clamping friction between hanger 423A and main member 421 will be overcome Front mounting bolt 444A will bear directly against main member sidewall openings 445, and also against hanger sidewall openings 443A For a rearward load application, the front of hanger 423A generally rotates downwardly-rearwardly from main member 421, and the rear of the hanger generally pushes up into the main member. During an extreme event, such as described hereinabove, front mounting bolt 444A can possibly tear through hanger sidewalls 440, such that hanger 423A will rotate about rear mounting bolt 444C in the direction of arrow R. Ledge 446 formed in main member 421 provides a mechanical stop or positive contact surface as hanger 423A rotates in the counterclockwise direction of arrow R, thus preventing or minimizing damage to aligned hanger sidewall openings 443C and rear mounting bolt 444C. When hanger 423A partially detaches from main member 421 as described, front mounting bolt 444A and spacer 442 should remain in place and be generally undamaged.

It should be noted that one particularly preferred feature of fourth embodiment slider box 420 of the present invention is that main member sidewalls 441 (FIG. 12) possess greater tear-out strength about mounting bolt openings 445 than do hanger sidewalls 440 about their corresponding mounting bolt openings 443A. This can be accomplished, for example, by designing main member sidewalls 441 to be thicker than hanger sidewalls 440, and/or for the main member sidewalls to be made from a higher-strength grade of material than the hanger sidewalls This minimizes the possibility that main member 421 will be damaged after such an extreme event.

Figure 14:
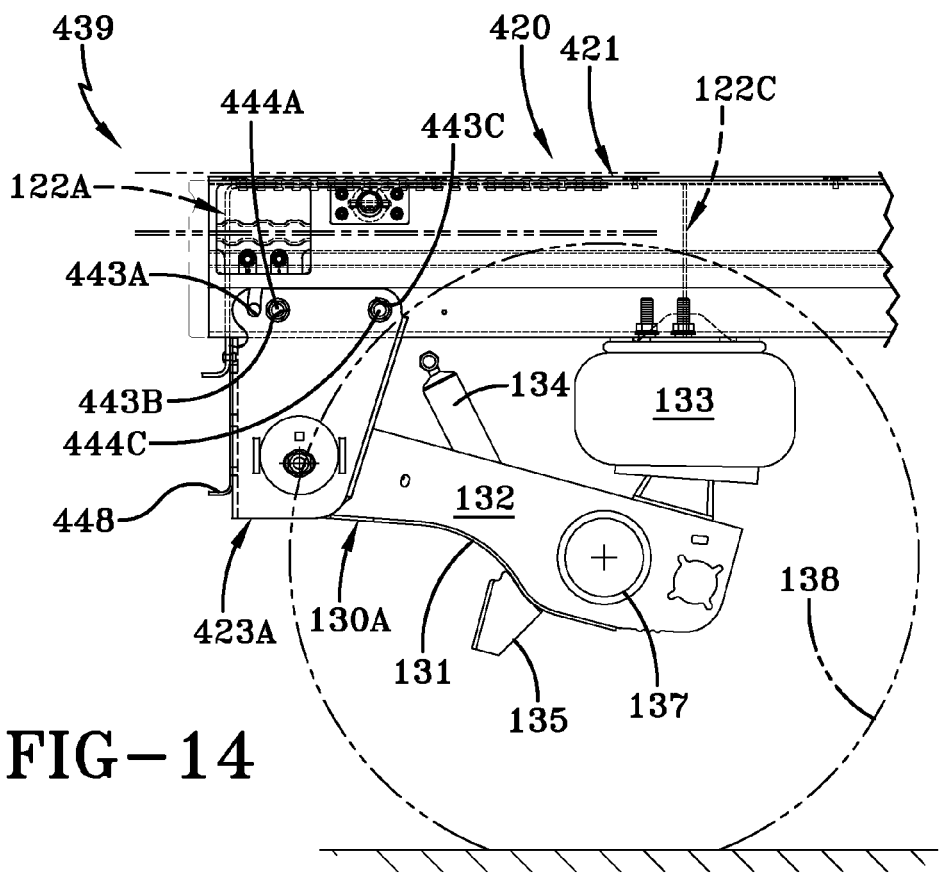
FIG. 14 is a view of the slider tandem of FIG. 13 after repair, in which one of the hanger mounting bolts has been relocated to secondary openings formed in the hanger and main member.

Referring now to FIG. 14, slider box 420 then can be temporarily repaired by removing front mounting bolt 444A and its spacer 442, rotating hanger 423A back to its normal position, and relocating those components to auxiliary hanger openings 443B and corresponding auxiliary aligned openings 450 (FIG. 13) formed in main member sidewalls 441. Hanger 423A is then attached to main member 121 in substantially the same manner as described above. This allows slider tandem 439 to be easily and efficiently repaired and remain in service until a new undamaged hanger 423A can be installed. Of course, a permanent repair then can be performed by replacing damaged hanger 423A and mounting it to main member 421 as shown in FIG. 11 and described hereinabove Thus, it can be seen that important features of fourth embodiment slider box 420 include enabling loads encountered during vehicle operation to be carried by the above-described clamping friction, while confining damage from severe impact events to an area of hanger sidewalls 440 adjacent to front mounting bolt openings 443A. As mentioned above, certain components of each embodiment of the slider box of the present invention may be adapted to suit specific design requirements. For example, in fourth embodiment slider box 420, it may be desirable to provide additional transverse reinforcement from the slider box in certain applications Thus, as shown in FIGS. 11 and 12, selected ones of cross members 122A, D may be adapted to connect to a hanger reinforcing member 448 that extends between driver side and passenger side front hangers 423A, and between driver side and passenger side rear hangers 423B.

Figure 15:
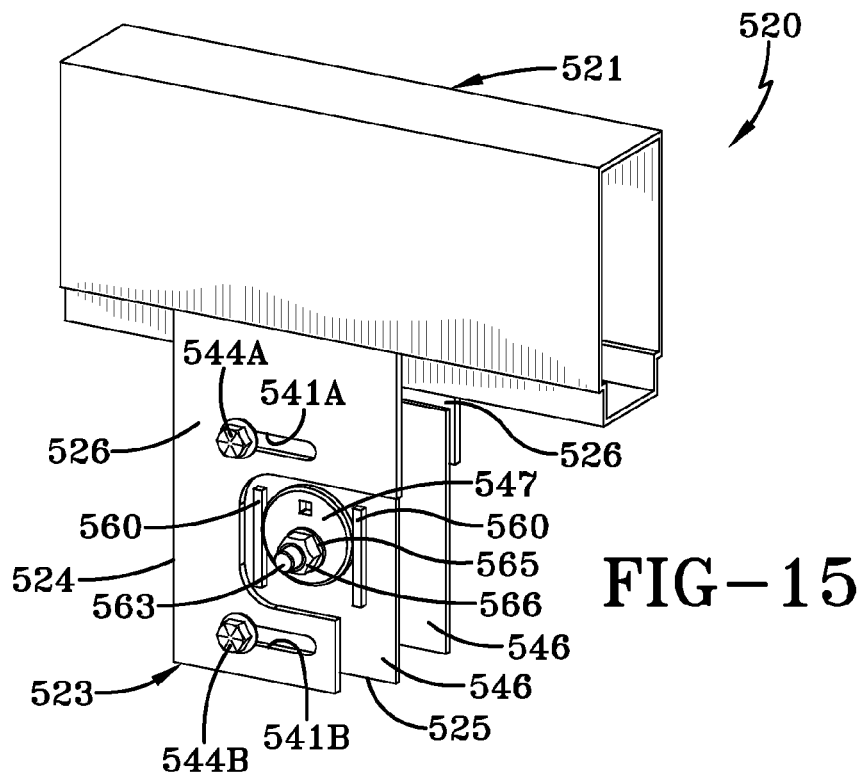
FIG. 15 is fragmentary driver-side top rear perspective view of a fifth exemplary embodiment of a portion of the slider box of the present invention, showing a two-piece hanger structure formed with oblong-shaped slots and mounted on a slider box main member.
Figure 16:
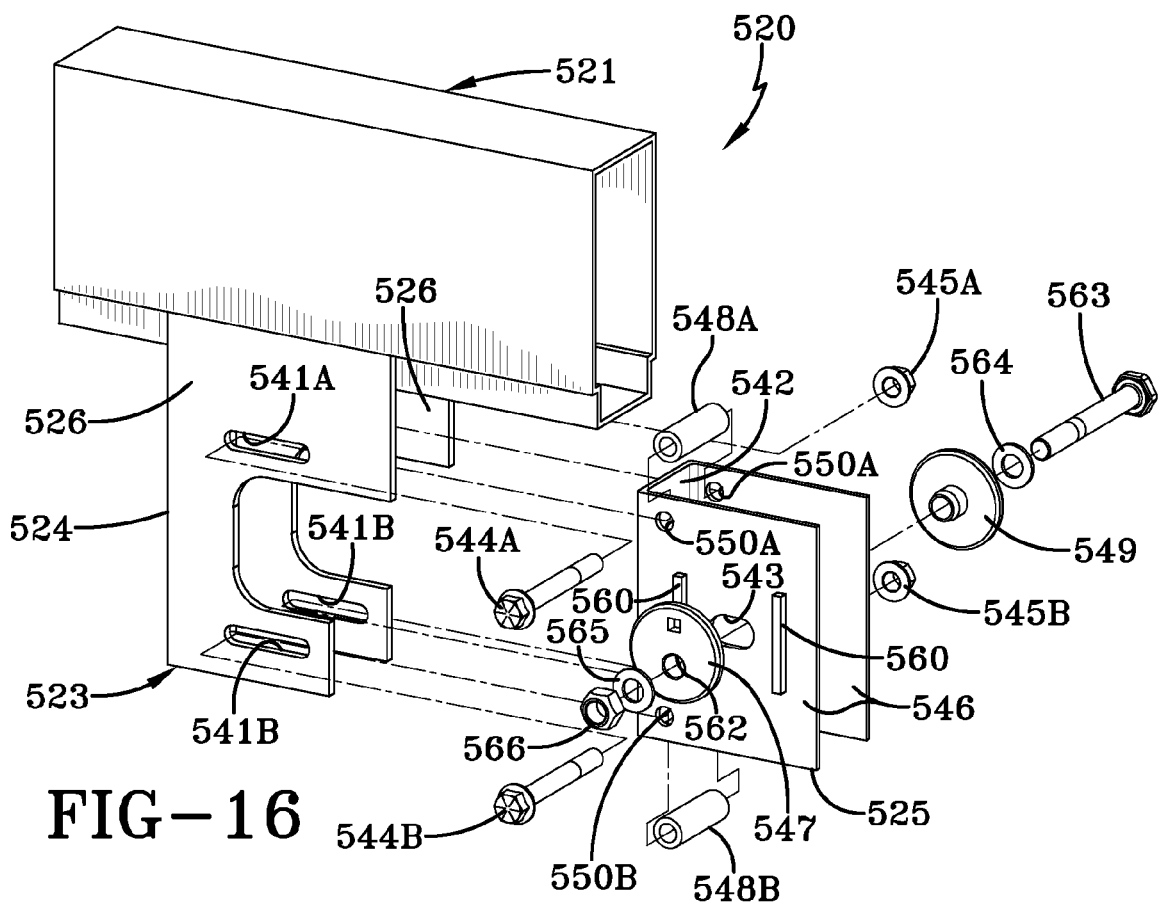
FIG. 16 is a partially-exploded driver-side top tear perspective view of the portion of the slider box of FIG. 15.

A fifth exemplary embodiment of the slider box of the present invention is shown in FIGS. 15 and 16, is indicated generally at 520, and is an improvement over prior art slider box 20. Since many aspects of fifth embodiment slider box 520 are similar to those of the above-described embodiments of the slider box of the present invention, only the primary differences between the fifth embodiment slider box and previously-described embodiments of the present invention are set forth below.

Fifth embodiment slider box 520 finds particular application when main members 521 have a generally rectangular-shaped cross section, rather than a C-shaped cross section. Fifth embodiment slider box 520 includes a hanger 523, which has a two-piece structure including an outer generally C-shaped shell 524 and an insert 525. More specifically, hanger shell 524 has a front wall (not shown) that is integrally formed with a pair of transversely-spaced, parallel and rearwardly extending C-shaped sidewalls 526. Hanger shell sidewalls 526 each are formed with vertically-spaced upper and lower generally horizontal oblong-shaped and aligned slots 541A, B.

Hanger insert 525 includes a front wall 542 that is integrally formed with a pair of transversely-spaced, parallel and rearwardly extending sidewalls 546 Insert 525 is dimensioned to slip fit in shell 524. Each insert sidewall 546 is formed with pairs of aligned openings 550A and 550B in the upper front and lower front portion of the sidewall, respectively. Insert 525 is slip fit in shell 524 so that insert openings 550A, 550B are aligned with the front end of slots 541A, 541B, respectively. Shell 524 preferably is welded to its respective main member 121, but can be bolted if desired Hanger 523 also includes upper and lower sleeves 548A, 548B, which generally extend across the internal width of insert 525, and are aligned with upper and lower insert openings 550A, 550B, respectively. Once insert 525 is fit in shell 524, bolts 544A, B are passed through the respective aligned slots 541A, B, openings 550A, B, and sleeves 548A, B, and are secured in place with nuts 545A, B, respectively. To facilitate the connection of an axle/suspension system beam, such as beam 132 shown in FIG. 11, to hanger 523, each hanger insert sidewall 546 is formed with an aligned oval-shaped sidewall opening 543 and a pair of vertically-extending, longitudinally spaced-apart nubs 560. An eccentric 547 formed with an opening 562 is disposed between nubs 560 so that opening 562 is aligned with insert sidewall openings 543. A locator 549 is disposed in inboard sidewall opening 543, and eccentric 547 and the locator are secured to insert 525 by a bolt 563, a pair of washers 564 and 565, and a securing nut 566 in a manner that is known to those skilled in the art.

When a heavy-duty vehicle employing slider box 520 encounters an extreme event such as a single-wheel impact, the clamp and friction loads of bolts 544 and nuts 545 will be overcome, allowing hanger insert 525 to slip rearwardly along slots 541A, B with the bolts and nuts This slipping action enables hanger 523 to absorb the forces created by the single-wheel impact and thus avoids or reduces significant damage to main member 521. In addition, in the case of a static hang-up, as the slipping action of hanger 523 absorbs forces created by the hang-up, this slipping or deflection of the hanger may redistribute the forces and may thereby also generally prevent or minimize damage to main members 521 and other components of slider box 520. After the extreme event has passed, insert 525 can then be reset in slots 541A, B of hanger shell 524, thereby minimizing the amount of time the vehicle is out of service.

A sixth exemplary embodiment of the slider box of the present invention also is an improvement over prior art slider box 20, is shown in FIGS. 17 and 18, and is indicated generally at 520'. Sixth embodiment slider box 520' differs from fifth embodiment slider box 520 only in the configuration of the slots formed in sidewalls 526' of hanger shell 524' of hanger 523'. Therefore, only that configuration will be described in detail.

More particularly, each sidewall 526' of hanger shell 524' is formed with a series of continuous, generally round, aligned openings 541A' and 541B'. Openings 541A' and 541B' extend longitudinally relative to the heavy-duty vehicle (not shown) and thereby enable sidewalls 526' to form a tooth 570 between each successive round portion of openings 541A', 541B'. Teeth 570 provide separation and increased load deflection when compared to smooth slots 541 of fifth embodiment hanger 523 (FIG. 15) as bolts 544A, B and hanger insert 525 move longitudinally rearwardly upon the heavy-duty vehicle encountering an extreme event. In addition, the proximity and interconnection of openings 541A' and 541B' provides a range of selectable positions for bolt 544 that secures hanger insert 525 to hanger shell 524' for optimal positioning of the insert within the shell.

Figure 19:
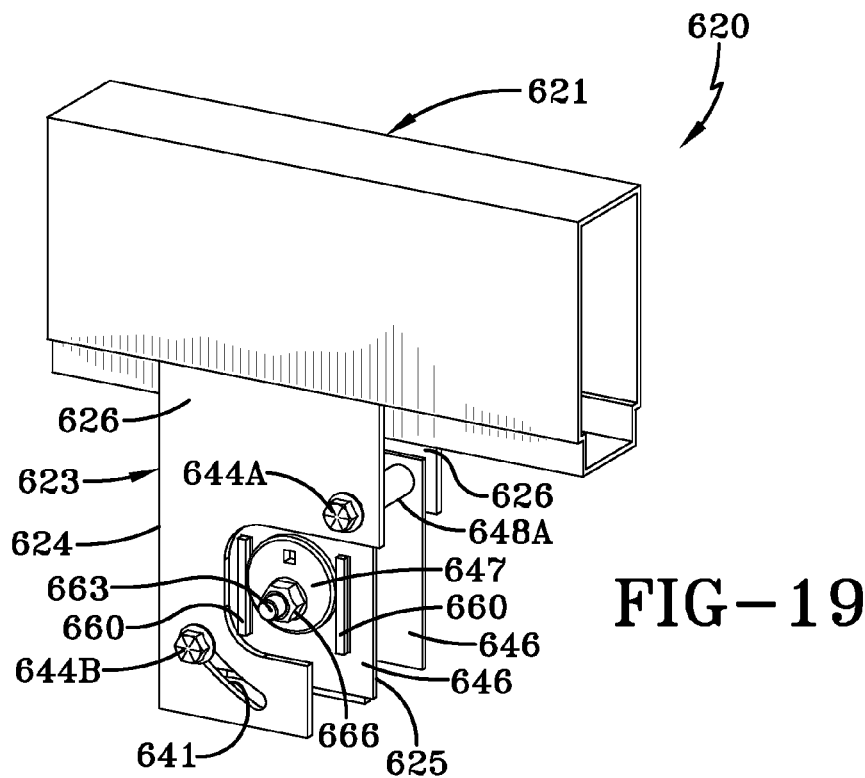
FIG. 19 is a fragmentary driver-side top rear perspective view of a seventh exemplary embodiment of a portion of the slider box of the present invention, showing a two-piece hanger structure formed with a single generally curved and diagonally-disposed oblong-shaped slot and mounted on a slider box main member.
Figure 20:
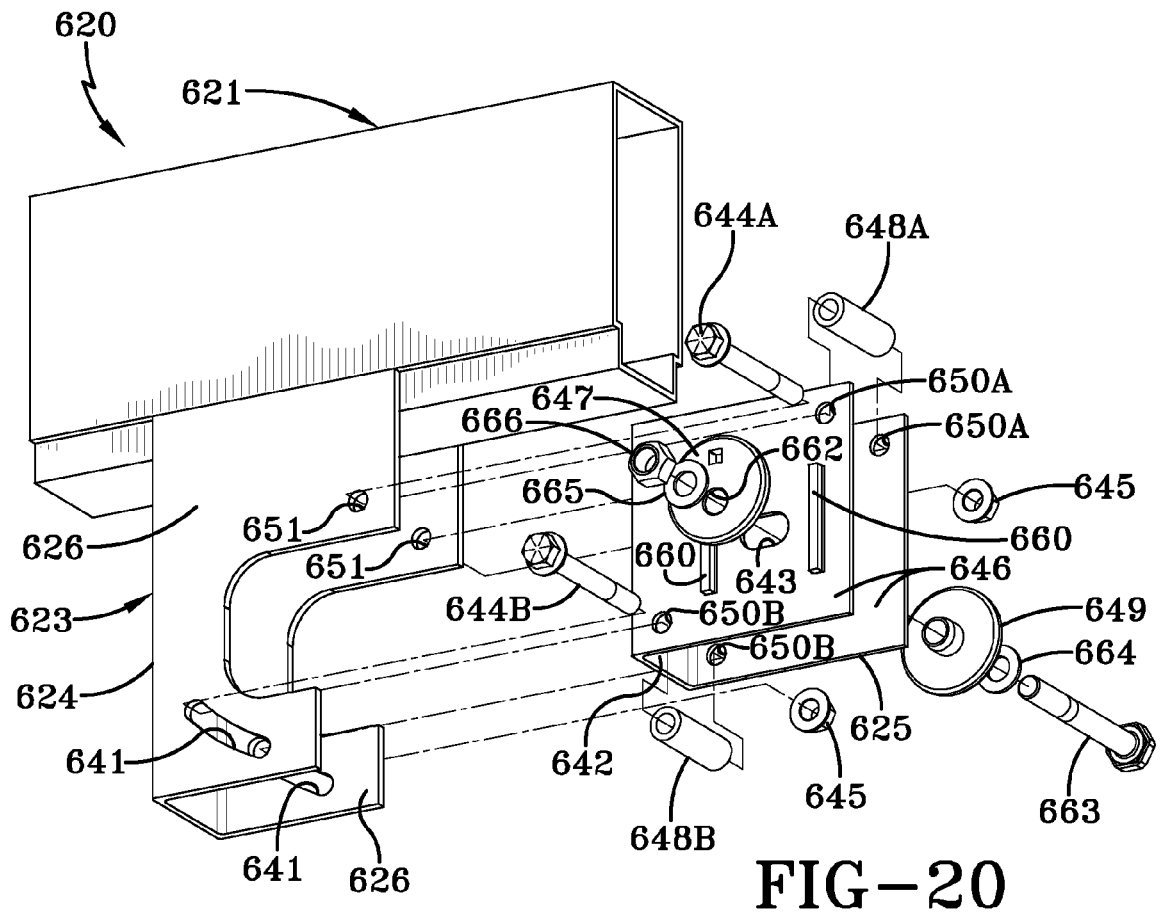
FIG. 20 is a partially-exploded driver-side bottom rear perspective view of the position of the slider box of FIG. 19.

A seventh exemplary embodiment of the slider box of the present invention is shown in FIGS. 19 and 20, is indicated generally at 620, and also is an improvement over prior art slider box 20. Since many aspects of seventh embodiment slider box 620 are similar to those of the above-described embodiments of the present invention, only the primary differences between the seventh embodiment slider box and the previously-described embodiments of the present invention are set forth below Seventh embodiment slider box 620 finds particular application when main members 621 have a generally rectangular-shaped cross section, rather than a C-shaped cross section. Seventh embodiment slider box 620 includes a hanger 623, which has a two-piece structure including an outer generally C-shaped shell 624 and an insert 625. More specifically, hanger shell 624 has a front wall (not shown) that is integrally formed with a pair of transversely-spaced, parallel and rearwardly extending C-shaped sidewalls 626. The lower portion of each hanger sidewall 626 is of a shorter longitudinal length than the upper portion of the sidewall, and is formed with a single diagonally-oriented, oblong-shaped slot 641. Slot 641 formed in hanger shell outboard sidewall 626 is aligned with the slot formed the in hanger shell inboard sidewall. Aligned circular openings 651 are formed in the upper portion of each hanger shell sidewall 626 adjacent the rear edge of each respective sidewall.

Hanger insert 625 includes a front wall 642 that is integrally formed with a pair of transversely-spaced, parallel and rearwardly extending sidewalls 646. Insert 625 is dimensioned to slip fit in shell 624. Each insert sidewall 646 is formed with pairs of aligned openings 650A and B in the upper rear and lower front portion of the sidewall, respectively. Insert 625 is slip fit in shell 624 so that insert openings 650A, 650B are aligned with openings 651 and slot 641, respectively Upper and lower sleeves 648A, 648B, which generally extend across the internal width of insert 625, are aligned with upper and lower insert openings 650A, B, respectively. Bolts 644A, B then are passed through the respective aligned slots 641, openings 650, 651, and sleeves 648, and are secured in place with nuts 645 To facilitate the connection of an axle/suspension system beam, such as beam 132 shown in FIG. 11, to hanger 623, each hanger insert sidewall 646 is formed with nubs 660 and an aligned oval-shaped opening 643 on its two parallel faces. An eccentric 647 formed with an opening 662 is disposed between nubs 660 so that opening 662 is aligned with insert sidewall openings 643. A locator 649 is disposed in inboard sidewall opening 643, and eccentric 647 and the locator are secured to insert 625 by means of a bolt 663, a nut 666, and a pair of washer is 664, 665 in a manner that is known to those skilled in the art.

When the heavy-duty vehicle employing slider box 620 encounters an extreme event such as a single-wheel impact, the clamp and friction loads of bolts 644 and nuts 645 will be overcome, allowing hanger insert 625 to slip generally rearwardly and downwardly along slot 641 with bolt 644B and nut 645B. This slipping action enables hanger 623 to absorb the forces created by the single-wheel impact and thus avoid or reduce significant damage to main member 621 In addition, in the case of a static hang-up, as the slipping action of hanger insert 625 absorbs forces created by the hang-up, this slipping or deflection of the hanger may redistribute the forces and may thereby also generally prevent or minimize damage to main members 621 and other components of slider box 620 After the extreme event has passed, insert 625 can then be reset in slot 641 of hanger shell 624, thereby minimizing the amount of time the vehicle is out of service.

Figure 21:
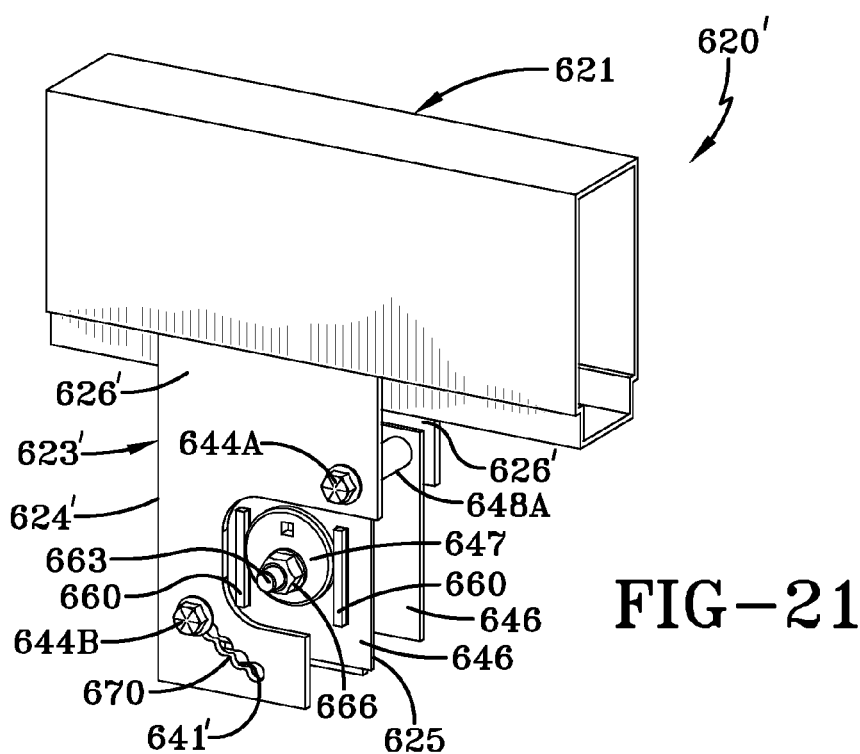
FIG. 21 is a fragmentary driver-side top rear perspective view of an eighth exemplary embodiment of a portion of the slider box of the present invention, showing a two-piece hanger structure formed with a series of round generally diagonally-disposed slots and mounted on a slider box main member.
Figure 22:
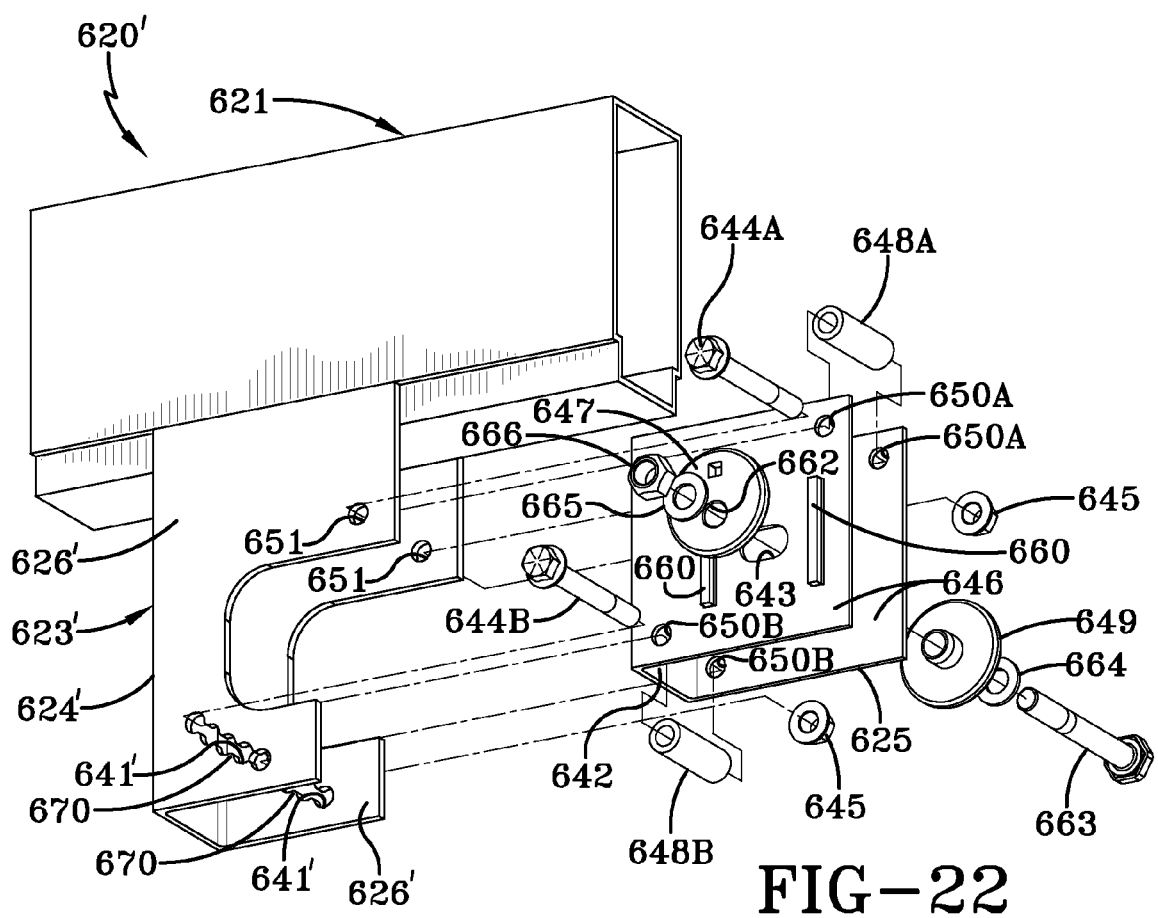
FIG. 22 is a partially-exploded driver-side bottom rear perspective view of the portion of the slider box of FIG. 21.

An eighth exemplary embodiment of the slider box of the present invention also is an improvement over prior art slider box 20, is shown in FIGS. 21 and 22, and is indicated generally at 620'. Eighth embodiment slider box 620' differs from seventh embodiment slider box 620 only in the configuration of the slots formed in sidewalls 626' of hanger shell 624' of hanger 623'. Therefore, only that configuration will be described in detail.

More particularly, each sidewall 626' of shell 624' is framed with a series of continuous, generally round, aligned openings 641'. Openings 641' enable sidewalls 626' to form a tooth 670 between each successive round portion of openings 641'. Teeth 670 provide separation and increased load deflection when compared to smooth slots 641 of seventh embodiment hanger 623 (FIG. 19) as bolt 644B and hanger insert 625 move longitudinally rearwardly and downwardly upon the heavy-duty vehicle encountering an extreme event. In addition, the proximity and interconnection of openings 641' provides a range of selectable positions for bolt 644B that secures hanger insert 625 to hanger shell 624' for optimal positioning of the insert within the shell.

A ninth exemplary embodiment of the present invention is shown in FIGS. 23 and 24, is indicated generally at 720, and is an improvement over prior art slider box 20. Since many aspects of ninth embodiment slider box 720 are similar to those of the above-described embodiments of the slider box of the present invention, only the primary differences between the ninth embodiment slider box and previously-described embodiments of the present invention are set forth below.

Ninth embodiment slider box 720 finds particular application when main members 721 have a generally rectangular-shaped cross section, rather than a C-shaped cross section. Ninth embodiment slider box 720 includes a hanger 723 that is attached to main member 721, in part by externally mounted driver side and passenger side strips 742A and B, respectively, which preferably are formed with notches 740 Notches 740 are formed generally in the center of each strip 742, and when a certain predetermined tension load is reached, the strips break at the notches, as will be described in greater detail below. Strips 742 preferably are made of aluminum, steel, or other robust material.

Hanger 723 includes a front wall 724 that is integrally formed with a pair of transversely-spaced, parallel and rearwardly extending sidewalls 726. Hanger sidewalls 726 are formed with nubs 760, which serve as alignment guides for an eccentric 747 in a manner similar to that as described above, and also add structural strength to hanger 723. Hanger sidewalls 726 are also formed with pairs of vertically offset mounting openings 750A, 750B in the upper front and upper rear portions of the sidewalls, respectively. Preferably, front opening 750A is offset from the upper edge of hanger sidewall 726 more than, or is lower than, rear opening 750B. The rear portion of hanger 723 is attached to main member 721 by passing a bolt 744 through aligned openings 750B in hanger 723, though aligned circular openings 751B formed in sidewalls 722 of main member 721, and through an aligned sleeve 748C which generally extends between the main member sidewalls. Bolt 744 is secured in place by nut 746.

The front portion of hanger 723 is attached to main member 721 by strips 742. Each strip 742 is formed with upper and lower circular openings 752A and B, respectively. To attach strips 742 to hanger 723, a lower bolt 741B is passed through lower opening 752B in driver side strip 742A, through aligned openings 750A framed in hanger sidewalls 726, through a lower aligned sleeve 748B which generally extends across the internal width of the hanger, and through the lower opening 752B in passenger side strip 742B. Lower bolt 741B is secured in place by a nut 745B To attach strips 742 to main member 721, an upper bolt 741A is passed through upper opening 752A in driver side strip 742A, through aligned openings 751A formed in main member sidewalls 722, through an upper aligned sleeve 748A which generally extends between the main member sidewalls, and through the upper opening 752A in passenger side strip 742B. Upper bolt 741A is secured in place by a nut 745A To facilitate the connection of an axle/suspension system beam, such as beam 132 shown in FIG. 11, to hanger 723, each hanger sidewall 726 is formed with nubs 760 and an aligned oval-shaped opening 743. An eccentric 747 formed with an opening 762 is disposed between nubs 760 so that opening 762 is aligned with hanger sidewall openings 743. A locator 749 is disposed in inboard sidewall opening 743, and eccentric 747 and the locator are secured to hanger 723 by means of a bolt 763, a nut 766, and a pair of washers 764, 765 in a manner that is known to those skilled in the art.

When a heavy-duty vehicle employing slider box 720 encounters an extreme event such as a single-wheel impact, hanger 723 will pivot about rear bolt 744 attached to main member 721 through openings 750B in hanger sidewalls 726 and openings 751B in main member sidewalls 722, causing strips 742 to break at their respective notches 740 when their tension loads are reached. Thus, the brunt of the forces and loads that are encountered by the heavy duty vehicle as a result of the single-wheel impact will be absorbed by strips 742, thereby preventing or reducing the possibility of hanger 723 and main member 721 sustaining significant damage In addition, in the case of a static hang-up, as strips 742 absorb forces created by the hang-up, the deflection and/or breaking of the strips may redistribute the forces and may thereby also generally prevent or minimize damage to main members 721 and other components of slider box 720. Moreover, after the extreme event has passed, strips 742 are easily, efficiently and economically replaceable, which prevents the vehicle from being out of service for a significant period of time.

Figure 25:
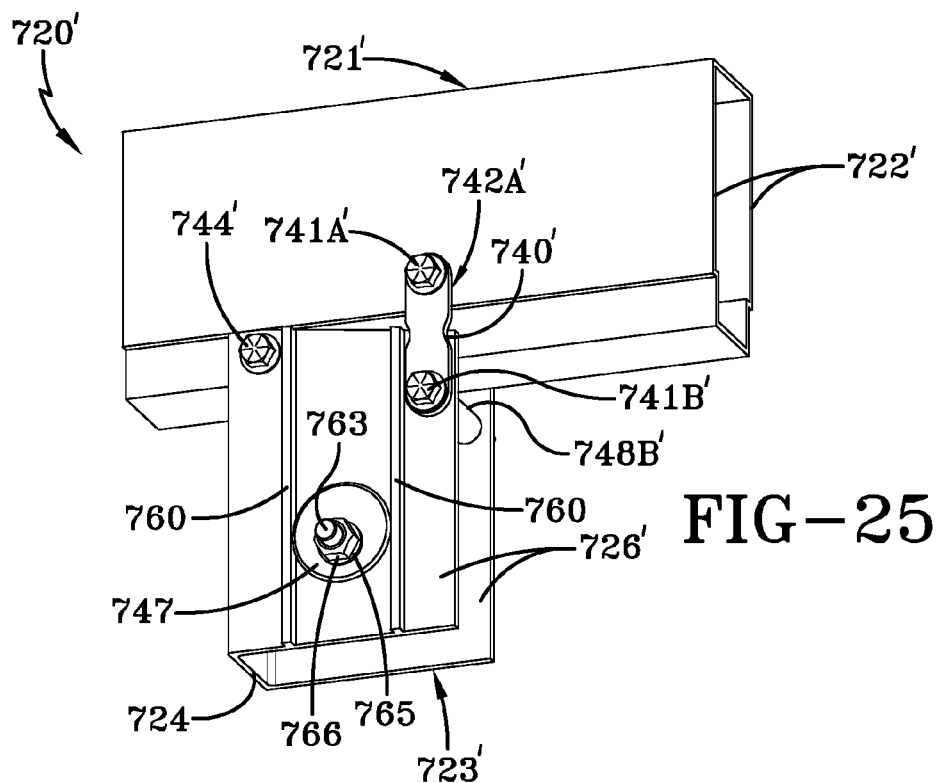
FIG. 25 is a fragmentary driver-side bottom rear perspective view of a tenth exemplary embodiment of a portion of the slider box of the present invention, showing a notched strip mounted at and extending between the outboard rear interface of the hanger and slider box main member.
Figure 26:
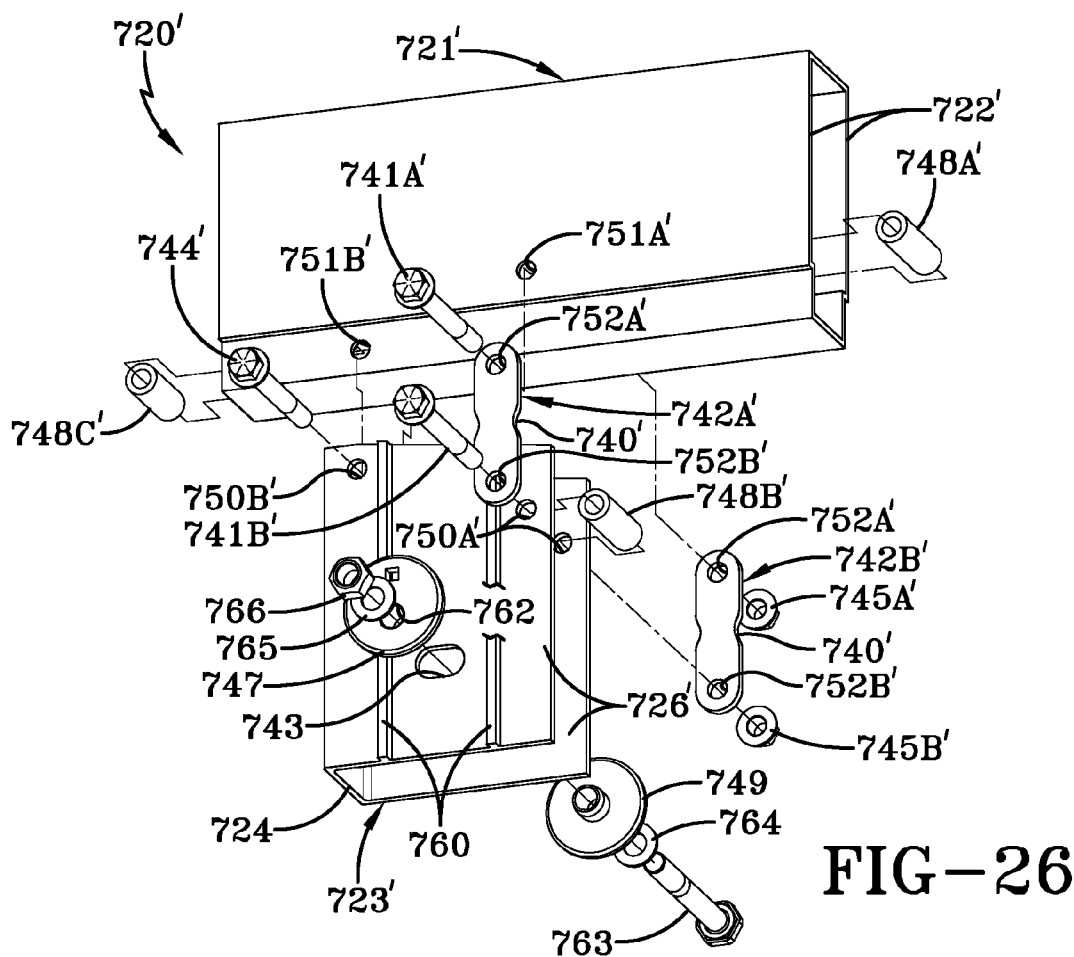
FIG. 26 is a partially-exploded driver-side bottom rear perspective view of the portion of the slider box of FIG. 25.

A tenth exemplary embodiment of the present invention also is an improvement over prior art slider box 20, is shown in FIGS. 25 and 26, and is indicated generally at 720'. Tenth embodiment slider box 720' differs from ninth embodiment slider box 720 only in the location of strips 742' in their attachment of hanger 723' to main member 721' Therefore, only that configuration will be described in detail.

More particularly, strips 742' are attached at the rear end of hanger 723' by passing a lower bolt 741B' through a lower opening 752B' formed in driver side strip 742A', through aligned openings 750A' formed in hanger sidewalls 726', through a lower aligned sleeve 748B' which generally extends across the internal width of the hanger, and through the lower opening 752B' in passenger side strip 742B' Lower bolt 741B' is secured in place by a nut 745B'. Strips 742' are attached to main member 721 by passing an upper bolt 741A' through an upper opening 752A' formed in driver side strip 742A', through aligned openings 751A' formed in main member sidewalls 722' through an upper aligned sleeve 748A' which generally extends between the main member sidewalls, and through the upper opening 752A' in passenger side strip 742B' Upper bolt 741A' is secured in place by a nut 745A'.

The front portion of hanger 723' is attached to main member 721' by passing a bolt 744' through aligned openings 750B' formed in hanger 723', through aligned circular openings 751B' formed in sidewalls 722' of main member 721', and through an aligned sleeve 748C' which generally extends between the main member sidewalls. Bolt 744' is secured in place by a nut that is similar to nut 746 shown in FIG. 26.

Thus, when a heavy-duty vehicle employing slider box 720' encounters an extreme event such as a single-wheel impact, hanger 723' will pivot about front bolt 744' attached through opening 750B' in sidewall 726', causing strips 742' to break at their respective notches 740' when their compressive load is reached. The brunt of the forces created by the vehicle encountering the single-wheel impact is absorbed by strips 742', thereby preventing or reducing the possibility of significant damage to hanger 723' and main member 721'. In addition, in the case of a static hang-up, as strips 742' absorb forces created by the hang-up, the deflection and/or breaking of the strips may redistribute the forces and may thereby also generally prevent or minimize damage to main members 721' and other components of slider box 720'.

Figure 27:
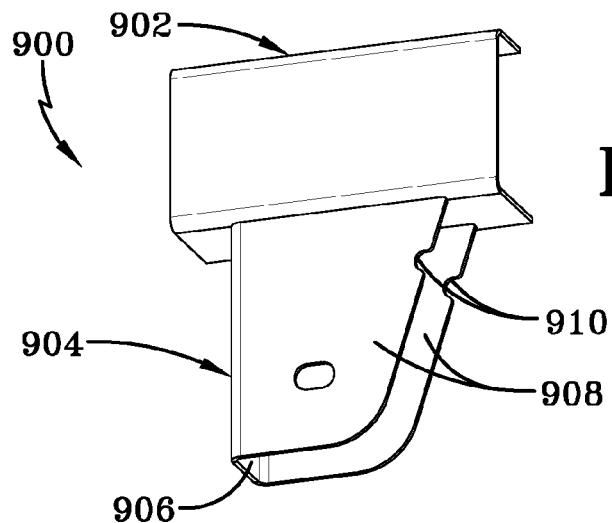
FIG. 27 is a fragmentary driver-side bottom rear perspective view of an eleventh exemplary embodiment of a portion of the slider box of the present invention, showing a hanger having a notch formed at each of its rearward edges and mounted on a slider box main member.
Figure 28:
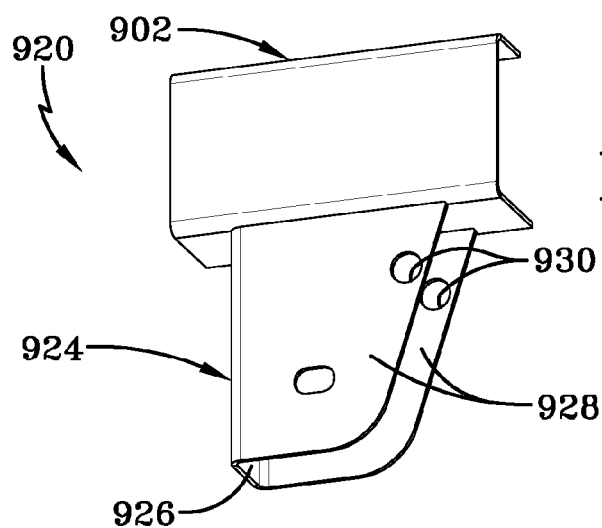
FIG. 28 is a fragmentary driver-side bottom rear perspective view of a twelfth exemplary embodiment of a portion of the slider box of the present invention, showing a hanger having an opening formed adjacent each of its rearward edges and mounted on a slider box main member.
Figure 29:
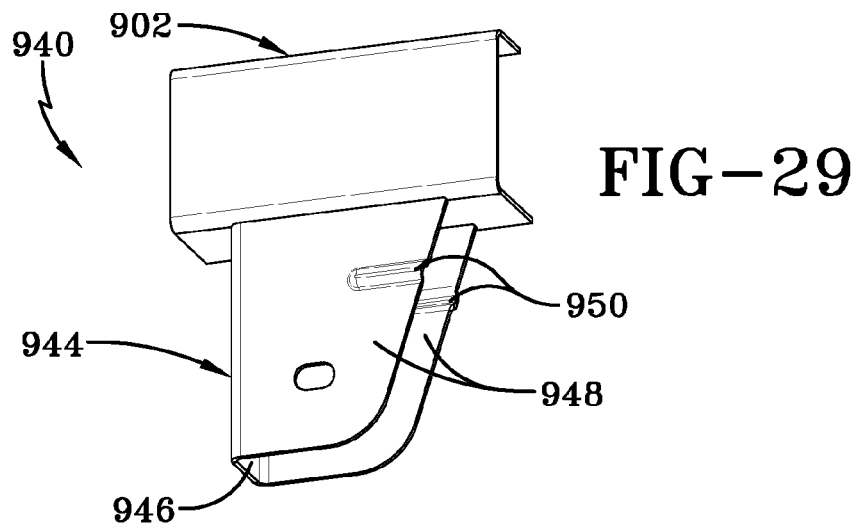
FIG. 29 is a fragmentary driver-side bottom rear perspective view of a thirteenth exemplary embodiment of a portion of the slider box of the present invention, showing a hanger having an indentation formed at each of its rearward edges and mounted on a slider box main member Similar numerals refer to similar parts throughout the drawings.

An eleventh exemplary embodiment of the present invention also is an improvement over prior art slider box 20, is shown in FIG. 27, and is indicated generally at 900. A twelfth exemplary embodiment of the present invention also is an improvement over prior art slider box 20, is shown in FIG. 28, and is indicated generally at 920. A thirteenth exemplary embodiment of the present invention also is an improvement over prior art slider box 20, is shown in FIG. 29, and is indicated generally at 940. Eleventh, twelfth and thirteenth embodiments slider box 900, 920, 940, respectively, are similar in construction to one another and thus will be described generally together.

More particularly, referring first to FIG. 27, eleventh embodiment slider box 900 includes a main member 902 and a hanger 904 that is directly attached to the main member, such as by welding or mechanical fasteners. Hanger 904 includes a front wall 906 that is integrally formed with a pair of transversely-spaced, parallel and rearwardly extending sidewalls 908. Formed at the teat end of each sidewall 908 is a feature 910, such as a notch or cutout that preferably is generally semicircular. It is understood that feature 910 includes other geometric shapes known in the art, such as shapes that are triangular, square, oval, etc. With reference now to FIG. 28, thirteenth embodiment slider box 920 includes a hanger 924 with a front wall 926 and sidewalls 928. A feature 930, such as an opening or cutout that preferably is generally circular, is formed adjacent the rear end of each sidewall 928. It is understood that feature 930 includes other geometric shapes known in the art, such as shapes that are triangular, square, oval, etc. With additional reference to FIG. 29, thirteenth embodiment slider box 940 includes a hanger 944 with a front wall and sidewalls 948. A feature 950, such as an indentation, is formed adjacent the rear end of each sidewall 948. While feature 950 is shown as a longitudinal indentation that protrudes outboardly from outboard sidewall 948 and inboardly from inboard sidewall 948, it is understood the feature includes any shape or orientation for an indentation of protrusion that creates a predetermined failure point for hanger 944

Each of features 910, 930, 950 is designed to create a predetermined point in hangers 904, 924, 944, respectively, at which the hangers will fail in an extreme event to prevent or reduce damage to main member 902. For example, when a heavy-duty vehicle employing one of slider boxes 900, 920, 940 encounters a single-wheel impact or static hang-up, the front portion of hanger 904, 924, 944, respectively, generally rotates downwardly-rearwardly flow main member 902, and the rear portion of the hanger generally pushes up into the main member. When this occurs, features 910, 930, 950 fail in a compressive mode, causing hanger 904, 924, 944, respectively, to collapse. In this manner, in a single-wheel impact, the forces created by the impact are absorbed by hanger 904, 924, 944, which is sacrificed to prevent or reduce damage to main member 902. In addition, in the case of a static hang-up, as hanger 904, 924, 944 collapses and absorbs forces created by the hang-up, the collapse of the hanger may redistribute the forces and may thereby also generally prevent or minimize damage to main members 721' and other components of slider box 720'. Slider box 900, 920, 940 then can be economically and efficiently repaired by replacing hanger 904, 924, 944, respectively.

Thus it can be seen that when the heavy-duty vehicle (not shown) encounters extreme loads, such as a single-wheel impact or a static hang-up, the isolated component, be it collapsible spacers 142, 242, 342, tear-away hanger 423A, hanger inserts 525, 625, strips 742, 742', or hanger features 910, 930, 950, absorbs the energy of the impact when suspension beam 132 is pulled rearwardly and inboardly and contacts and/or exerts force on the respective hanger, which in turn typically is driven upward into the slider box main member. Instead of the hanger directly impacting the main member, the force of the collision is absorbed and/or deflected by the isolated component. In this manner, damage to the main members and/or cross members of the vehicle frame or subframe by movement of the hanger during an extreme event is minimized when compared to prior art frames and subframes.

More specifically, when generally rigid spacers 142, 242, 342 reach their vertical crush force limit, they buckle and then collapse, thereby effectively buffering the main member from being subjected to the brunt of the force created by the impact. Hanger 423A will tear away from its front mounting bolt 444A when its clamping friction is overcome. Inserts 525, 625 will deflect under the force of the impact, and strips 742, 742' will break when their load limit is reached, thereby buffering the hanger and main member from the excessive loads imposed. Moreover, hanger features 910, 930, 950 cause the hanger to collapse during an extreme event buffering the main member. These isolated components are relatively low-cost items that can then be easily replaced by removing bolts, or if the hanger is welded to the main member, a hanger weld, and detaching the damaged isolated component from the slider tandem at any rail interface where an impact has caused the components to collapse. A new isolated component can then be attached in after market assembly.

In addition, in the case of a static hang-up, as the energy-absorbing component of the improved frame for heavy-duty vehicles of the present invention initially absorbs the force that is created by the hang-up, as described immediately above, the collapse or deflection of the energy-absorbing component may redistribute the force and thereby also generally prevents or minimizes damage to the main members and other components of the vehicle frame. Moreover, in the case of a static hang-up, by yielding or collapsing in a predetermined manner, the energy-absorbing component of the improved frame for heavy-duty vehicles of the present invention may help the hanger to deflect, which in turn may enable the wheel to move off of the obstacle that is causing the hang-up, and thereby reduce the load input from the static hang-up, which further reduces damage to the components of the vehicle frame.

The improved frame for heavy-duty vehicles of the present invention is a less costly alternative than prior art frame structures, which often require major components of the frame to be replaced at considerable cost after an extreme event. By incorporating inexpensive energy-absorbing isolated components that will absorb the brunt of the force of impact, which ate then easily and inexpensively replaced, the heavy-duty vehicle frame of the present invention eliminates excessive replacement cost, repair/replacement time and labor, and long trailer down time.

Moreover, by using bolted connections, the slider box of the present invention enables dissimilar metals to be joined in a stronger and more dependable manner than by welding. In this manner, these embodiments of the slider box of the invention provide a strong connection between the main member and the hangers when lightweight materials, such as aluminum and aluminum alloys, are used for either or both the main member and the hangers.

It is to be understood that, depending on specific design requirements, the above-described use of bolted or mechanically fastened connections for attaching the hangers to the main members of the improved frame for heavy-duty vehicles of the present invention enables the bolts to be designed to bend or break at a predetermined force level. In this manner, the bolts of the bolted hanger-to-main-member connection may be the energy-absorbing component for the frame, or may be used in conjunction with one or more of the above-described energy-absorbing components, without affecting the overall concept of the invention. It is also to be understood that, depending on application/design considerations, all of the above-described energy-absorbing components may be used to connect the front hangers to the vehicle frame or subframe, or to connect the rear hangers to the vehicle frame or subframe where rear hangers are employed, or to connect all of the hangers to the vehicle frame or subframe where multiple pairs of hangers are used.

The present invention also includes a method for repairing a heavy-duty vehicle frame that has been subjected to an extreme event using an energy-absorbing, replaceable component. The method includes steps in accordance with the description that is presented above and shown in FIGS. 3-29.

It is important to note that reference hereinabove has been made to preferred embodiments of the slider box of the present invention with the understanding that such reference is by way of example, and the present invention applies to heavy-duty vehicle primary frames, movable subframes and non-movable subframes for heavy-duty vehicles such as tractor-trailers or semi-trailers, and straight trucks such as dump trucks. In addition, it is understood that the present invention finds application in all types of heavy-duty vehicle primary frames, movable subframes and non-movable subframes known to those skilled in the art, without affecting the concept or operation of the invention. Moreover, the present invention applies to primary frames, movable subframes and non-movable subframes that are capable of being outfitted with one, two, three or more axle/suspension systems. Also, while the present invention has been described with reference to a particular type of axle/suspension system, it applies to any suspension system or axle/suspension system known to those skilled in the art.

It is also to be noted that the number and arrangement of components may be adjusted from that as described above to suit particular design requirements, without affecting the overall concept or operation of the invention. It is also to be noted that, while reference has been made to bolts as mechanical fasteners, other mechanical fasteners, such as rivets, pins, tabs and the like, as well as combinations thereof, may be used. Moreover, the use of such mechanical fasteners may be used in selective combination with welds, so as to use welded connections in certain areas of the frame or subframe, and mechanical fasteners in other areas of the frame or subframe.

It is to be further understood that, while reference above has been made to the use of metals such as steel, aluminum or an aluminum alloy with the present invention, other materials may be used. For example, other ferrous and nonferrous metals and alloys thereof may be used. Moreover, the present invention may be used with composite materials of dissimilar metals that are not readily weldable, in which case adhesives or mechanical fasteners may be used to bond or secure the components.

The present invention has been described with reference to specific exemplary embodiments. It shall be understood that this illustration is by way of example and not by way of limitation. Potential modifications and alterations will occur to others upon a reading and understanding of this disclosure, and it is understood that the invention includes all such modifications and alterations and equivalents thereof Accordingly, the frame for heavy-duty vehicles of the present invention is simplified, provides an effective, safe, inexpensive and efficient structure which achieves all the enumerated objectives, provides for eliminating difficulties encountered with prior art frames, and solves problems and obtains new results in the art.

In the foregoing description, certain terms have been used for brevity, clarity and understanding; but no unnecessary limitations ate to be implied therefrom beyond the requirements of the prior art, because such terms are used for descriptive purposes and are intended to be broadly construed Moreover, the description and illustration of the invention is by way of example, and the scope of the invention is not limited to the exact details shown or described

Having now described the features, discoveries and principles of the invention, the manner in which the improved frame for heavy-duty vehicles is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A frame for a heavy-duty vehicle, said frame including:
   a pair of spaced-apart, parallel, elongated, and longitudinally-extending main members;
   at least a pair of transverse cross members extending between and being attached to said main members;
   at least a pair of hangers, each one of said hangers being attached to and depending from a respective one of said main members for suspending an axle/suspension system from said frame; and
   a component capable of yielding upon occurrence of an extreme event during vehicle operation, said yieldable component being selected from the group consisting of:
      a yieldable component being disposed above each one of said hangers and below the hanger's respective main member, said yieldable component extending between its respective hanger and main member, the yieldable component yielding upon occurrence of said extreme event; and
      at least one feature formed in each one of said hangers, said at least one feature causing its respective hanger to yield upon occurrence of said extreme event,
   whereby damage to at least one of said main members and said cross members caused by movement of at least one of said hangers during occurrence of said extreme event is minimized.

2. The frame for a heavy-duty vehicle of claim 1, wherein said yieldable component is a discrete component.

3. The frame for a heavy-duty vehicle of claim 2, wherein said yieldable component includes at least one collapsible spacer.

4. The frame for a heavy-duty vehicle of claim 3, wherein said at least one collapsible spacer includes a plurality of collapsible spacers.

5. The frame for a heavy-duty vehicle of claim 3, wherein said at least one collapsible spacer includes a tubular structure.

6. The frame for a heavy-duty vehicle of claim 1, said frame further comprising a mechanical fastener disposed between each one of the hangers and the hanger's respective main member.

7. The frame for a heavy-duty vehicle of claim 6, wherein a portion of said hanger tears away from said mechanical fastener upon occurrence of said extreme event.

8. The frame for a heavy-duty vehicle of claim 6, wherein said mechanical fastener fails upon occurrence of said extreme event.

9. The frame for a heavy-duty vehicle of claim 1, wherein said at least one feature includes an insert in said hanger, said insert moving upon occurrence of said extreme event.

10. The frame for a heavy-duty vehicle of claim 9, wherein said at least one feature further includes a horizontally-oriented opening along which said insert moves.

11. The frame for a heavy-duty vehicle of claim 9, wherein said at least one feature further includes an inclined opening along which said insert moves.

12. The frame for a heavy-duty vehicle of claim 1, wherein said at least one feature includes a notch formed at a rear end of said hanger.

13. The frame for a heavy-duty vehicle of claim 1, wherein said at least one feature includes an opening formed adjacent a rear end of said hanger.

14. The frame for a heavy-duty vehicle of claim 1, wherein said at least one feature includes an indentation formed adjacent a rear end of said hanger.

15. A frame for a heavy-duty vehicle, said frame including:
   a pair of spaced-apart, parallel, elongated, and longitudinally-extending main members;
   at least a pair of transverse cross members extending between and being attached to said main members;
   at least a pair of hangers, each one of said hangers being attached to and depending from a respective one of said main members for suspending an axle/suspension system from said frame; and
   a notch formed at a rear end of each one of said hangers to cause the hanger to collapse upon an extreme event during vehicle operation, whereby damage to at least one of said main members and said cross members caused by movement of at least one of said hangers during said extreme event is minimized.

16. A frame for a heavy-duty vehicle, said frame including:
   a pair of spaced-apart, parallel, elongated, and longitudinally-extending main members;
   at least a pair of transverse cross members extending between and being attached to said main members;
   at least a pair of hangers, each one of said hangers being attached to and depending from a respective one of said main members for suspending an axle/suspension system from said frame; and
   an opening formed adjacent a rear end of each one of said hangers to cause the hanger to collapse upon an extreme event during vehicle operation, whereby damage to at least one of said main members and said cross members caused by movement of at least one of said hangers during said extreme event is minimized.

17. A frame for a heavy-duty vehicle, said frame including:
   a pair of spaced-apart, parallel, elongated, and longitudinally-extending main members;
   at least a pair of transverse cross members extending between and being attached to said main members;

at least a pair of hangers, each one of said hangers being attached to and depending from a respective one of said main members for suspending an axle/suspension system from said frame; and an indentation formed adjacent a rear end of each one of said hangers to cause the hanger to collapse upon an extreme event during vehicle operation, whereby damage to at least one of said main members and said cross members caused by movement of at least one of said hangers during said extreme event is minimized.

* * * * *

UNITED STATES PATENT AND TRADEMARK OFFICE
CERTIFICATE OF CORRECTION

PATENT NO. : 7,658,412 B2
APPLICATION NO. : 11/561006
DATED : February 9, 2010
INVENTOR(S) : Ramsey et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Twenty-eighth Day of December, 2010

David J. Kappos
*Director of the United States Patent and Trademark Office*